(12) United States Patent
Ishii et al.

(10) Patent No.: US 12,330,065 B2
(45) Date of Patent: *Jun. 17, 2025

(54) COMPUTER-READABLE NON-TRANSITORY STORAGE MEDIUM HAVING INFORMATION PROCESSING PROGRAM STORED THEREIN, INFORMATION PROCESSING APPARATUS, INFORMATION PROCESSING METHOD, AND INFORMATION PROCESSING SYSTEM

(71) Applicant: Nintendo Co., Ltd., Kyoto (JP)

(72) Inventors: Yuya Ishii, Kyoto (JP); Susumu Ishihara, Kyoto (JP); Yusuke Shibata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 288 days.

This patent is subject to a terminal disclaimer.

(21) Appl. No.: 18/120,805

(22) Filed: Mar. 13, 2023

(65) Prior Publication Data

US 2024/0033627 A1 Feb. 1, 2024

(30) Foreign Application Priority Data

Jul. 28, 2022 (JP) ................................ 2022-120191

(51) Int. Cl.
*A63F 13/58* (2014.01)
*A63F 13/45* (2014.01)
(Continued)

(52) U.S. Cl.
CPC .............. *A63F 13/58* (2014.09); *A63F 13/45* (2014.09); *A63F 13/533* (2014.09); *A63F 13/69* (2014.09);
(Continued)

(58) Field of Classification Search
CPC ...... A63F 13/822; A63F 13/45; A63F 13/533; A63F 13/58; A63F 13/69; A63F 13/00; A63F 13/44; A63F 13/46
See application file for complete search history.

(56) References Cited

U.S. PATENT DOCUMENTS 6,807,521 B1 * 10/2004 Kurosawa ............... A63F 13/45
703/22
6,860,807 B2 * 3/2005 Tsuchida ............. A63F 13/5372
463/7
(Continued)

FOREIGN PATENT DOCUMENTS

JP    2002-200350    7/2002
JP    2003-210846    7/2003
(Continued)

OTHER PUBLICATIONS

May 28, 2024 Office Action issued in Japanese Patent Application No. 2022-120191, pp. 1-2 [machine translation included].

*Primary Examiner* — William H McCulloch, Jr.
(74) *Attorney, Agent, or Firm* — Nixon & Vanderhye PC

(57) ABSTRACT

A role capable of being designated and determined on the basis of an aptitude information piece set for an operation character, among a plurality of roles for which usable item types are determined, respectively, is presented and designated. In addition, a special character with which any of a plurality of aptitude information pieces is associated is associated with the operation character. A game event is advanced using an item designated by a user from among aptitude items corresponding to the role of the operation character among owned items owned by the operation character. A parameter set for a combination of the operation character and the special character is updated on the basis of progress of a game, and when the parameter satisfies an aptitude information addition condition, an aptitude infor- (Continued)

mation piece of the special character is added to the operation character.

20 Claims, 26 Drawing Sheets

(51) Int. Cl.
*A63F 13/533* (2014.01)
*A63F 13/69* (2014.01)
*A63F 13/822* (2014.01)
*A63F 13/44* (2014.01)
*A63F 13/46* (2014.01)

(52) U.S. Cl.
CPC ............ *A63F 13/822* (2014.09); *A63F 13/44* (2014.09); *A63F 13/46* (2014.09)

(56) References Cited

U.S. PATENT DOCUMENTS

| | | | | |
|---|---|---|---|---|
| 7,497,777 | B2* | 3/2009 | Machida | A63F 13/67 463/9 |
| 8,000,924 | B2* | 8/2011 | Sato | A63F 13/428 702/92 |
| 9,254,442 | B2* | 2/2016 | Arakawa | A63F 13/46 |
| 9,959,008 | B2* | 5/2018 | Tan | G06F 3/1462 |
| 10,092,842 | B2* | 10/2018 | Rogers | A63F 13/2145 |
| 12,023,586 | B2* | 7/2024 | Yamamura | A63F 13/45 |
| 2003/0092492 | A1 | 5/2003 | Ishii et al. | |
| 2004/0077394 | A1* | 4/2004 | Matsuno | A63F 13/79 463/8 |
| 2004/0259613 | A1* | 12/2004 | Machida | A63F 13/10 463/1 |
| 2004/0259636 | A1* | 12/2004 | Machida | A63F 13/10 463/30 |
| 2005/0143173 | A1* | 6/2005 | Barney | A63F 13/25 463/37 |
| 2006/0154726 | A1* | 7/2006 | Weston | A63F 13/31 463/36 |
| 2013/0116052 | A1 | 5/2013 | Okada et al. | |
| 2021/0162307 | A1* | 6/2021 | Araya | A63F 13/67 |
| 2022/0134231 | A1 | 5/2022 | Ohashi et al. | |
| 2023/0166191 | A1* | 6/2023 | Akitsu | A63F 13/825 463/31 |
| 2024/0033627 | A1* | 2/2024 | Ishii | A63F 13/58 |
| 2024/0033628 | A1* | 2/2024 | Ishii | A63F 13/69 |
| 2024/0293753 | A1* | 9/2024 | Taguchi | A63F 13/87 |
| 2024/0316464 | A1* | 9/2024 | Sato | A63F 13/69 |
| 2024/0342602 | A1* | 10/2024 | Sato | A63F 13/58 |
| 2024/0359097 | A1* | 10/2024 | Toyofuku | A63F 13/69 |
| 2024/0367040 | A1* | 11/2024 | Akitake | A63F 13/46 |

FOREIGN PATENT DOCUMENTS

| | | |
|---|---|---|
| JP | 2016-041312 | 3/2016 |
| JP | 2019-048002 | 3/2019 |
| JP | 2021-87504 | 6/2021 |
| JP | 2022-017687 | 1/2022 |
| JP | 2022-073609 | 5/2022 |

* cited by examiner

| OWN ARMY CHARACTER ID | OWN ARMY CHARACTER NAME | INITIAL APTITUDE INFORMATION | INITIAL CLASS INFORMATION | APPEARANCE DATA |
|---|---|---|---|---|
| 521 | 522 | 523 | 524 | 525 |
| 001 | OWN ARMY CHARACTER A | SWORD | SWORDSMAN | ... |
| 002 | OWN ARMY CHARACTER B | AXE | SOLDIER | ... |
| 003 | OWN ARMY CHARACTER C | BOW | ARCHER | ... |
| 004 | OWN ARMY CHARACTER D | SPEAR | LANCER | ... |
| ⋮ | ⋮ | ⋮ | ⋮ | ⋮ |

F I G. 2 3

| 505 | | | | | | | | |
|---|---|---|---|---|---|---|---|---|
| RING ID 551 | SPECIAL CHARACTER NAME 552 | FIRST SPECIAL WEAPON INFORMATION 553 | SECOND SPECIAL WEAPON INFORMATION 554 | THIRD SPECIAL WEAPON INFORMATION 555 | BOND REWARD INFORMATION 556 | RING APPEARANCE DATA 557 | SPECIAL CHARACTER APPEARANCE DATA 558 | INHERITANCE APTITUDE INFORMATION 559 |
| R001 | SPECIAL CHARACTER A | SPECIAL WEAPON A1 | SPECIAL WEAPON A2 | SPECIAL WEAPON A3 | .... | .... | .... | SWORD |
| R002 | SPECIAL CHARACTER B | SPECIAL WEAPON B1 | SPECIAL WEAPON B2 | SPECIAL WEAPON B3 | .... | .... | .... | AXE |
| R003 | SPECIAL CHARACTER C | SPECIAL WEAPON C1 | SPECIAL WEAPON C2 | SPECIAL WEAPON C3 | .... | .... | .... | SWORD |
| R004 | SPECIAL CHARACTER D | SPECIAL WEAPON D1 | SPECIAL WEAPON D2 | SPECIAL WEAPON D3 | .... | .... | .... | BOW |
| ... | | | | | | | | |

FIG. 24

| OWNED CHARACTER ID 5101 | WORN RING ID 5102 | INHERITED APTITUDE INFORMATION 5103 | BOND DATA 5104 | CURRENT CLASS 5105 | CURRENT Lv 5106 | STATUS INFORMATION 5107 | NORMAL BELONGING INFORMATION 5108 |
|---|---|---|---|---|---|---|---|
| 001 | R001 | AXE, BOW, ... | ... | SOLDIER | 10 | ... | ... |
| 002 | R002 | SWORD | ... | SWORDS MAN | 8 | ... | ... |
| 003 | NONE | NONE | ... | MONK | 5 | ... | ... |
| ... | ... | ... | ... | ... | ... | ... | ... |

| SPECIAL CHARACTER ID (5109) | ACQUIRED EXPERIENCE VALUE (5110) | BOND LEVEL INFORMATION (5111) |
|---|---|---|
| R001 | 0025 | 2 |
| R002 | 0000 | 1 |
| R003 | 0005 | 1 |
| R004 | 0000 | 1 |
| ⋮ | ⋮ | ⋮ |

COMPUTER-READABLE NON-TRANSITORY STORAGE MEDIUM HAVING INFORMATION PROCESSING PROGRAM STORED THEREIN, INFORMATION PROCESSING APPARATUS, INFORMATION PROCESSING METHOD, AND INFORMATION PROCESSING SYSTEM

CROSS REFERENCE TO RELATED APPLICATION

This application claims priority to Japanese Patent Application No. 2022-120191 filed on Jul. 28, 2022, the entire contents of which are incorporated herein by reference.

FIELD

The present disclosure relates to information processing for executing game processing using an operation character.

BACKGROUND AND SUMMARY

Hitherto, simulation games in which characters are used as pieces have been known. As such games, games in which a role is set for each ally character and an ability corresponding to the role is given to the ally character have also been known.

As some of the above games, there are also games having an element capable of changing the role. By such a role changing element, it is possible to allow growth of the ally character to be enjoyed and to enhance the strategic characteristics of the simulation game.

Moreover, as some of the above games, there are also games in which a large number of unique characters appear and which have an element of, for example, causing a conversation event to occur with a combination of the characters, thereby allowing interaction between the characters to be enjoyed.

With each of the above elements, it is possible to enhance the entertainment characteristics of the game, but there is still room for further improving the entertainment characteristics of the above game on the basis of these two elements.

Therefore, an object of the present disclosure is to provide a computer-readable non-transitory storage medium having an information processing program stored therein, an information processing apparatus, an information processing method, and an information processing system which realize a game having higher entertainment characteristics by using a game nature in which a large number of characters having individual personalities appear and a role setting element for each character.

In order to attain the object described above, for example, the following configuration examples are exemplified.

(Configuration 1)

Configuration 1 is directed to a computer-readable non-transitory storage medium having stored therein an information processing program causing a computer of an information processing apparatus, capable of executing a game using an operation character, to: present a role capable of being designated among a plurality of roles with which usable item types are associated, respectively, on the basis of an aptitude information piece set for the operation character among a plurality of aptitude information pieces, and assign a role designated by a user to the operation character; set an arbitrary item selected by the user as an owned item owned by the operation character; associate a special character with which any of the plurality of aptitude information pieces is associated, with the operation character; advance a game event included in the game, while causing the operation character to use an item designated by the user from among aptitude items belonging to the usable item type associated with the role assigned to the operation character among the owned items owned by the operation character; update a parameter set for a combination of the operation character and the special character associated with the operation character, on the basis of progress of the game; and when the parameter related to the operation character and the special character associated with the operation character satisfies an aptitude information addition condition, add the aptitude information piece associated with the special character to the operation character.

According to the above configuration example, if the parameter related to the operation character and the special character satisfies the aptitude information addition condition, the aptitude information piece of the special character is added to the operation character. Accordingly, it is possible to increase the number of roles that can be assigned to the operation character, thereby improving the strategic characteristics of the game. In addition, in the process of making the above parameter satisfy the above aptitude information addition condition, the user can be allowed to enjoy various combinations of operation characters and special characters. Moreover, it is also possible to improve the entertainment characteristics regarding growth of the operation character in terms of, for example, what kind of aptitude information piece is to be added to the operation character.

(Configuration 2)

According to Configuration 2, in Configuration 1 described above, a special character designated by the user among a plurality of the special characters may be associated with an operation character designated by the user among a plurality of the operation characters, and the information processing program may further cause the computer to manage the parameter for each of combinations of the plurality of the special characters and the plurality of the operation characters.

According to the above configuration example, since the plurality of the operation characters and the plurality of the special characters exist, the number of options for combinations of operation characters and special characters can be increased. In addition, it is also possible to improve the strategic characteristics of the game while providing the user with the fun of trying out various combinations.

(Configuration 3)

According to Configuration 3, in Configuration 1 or 2 described above, in addition to the usable item type, item-specifying information for specifying a usable item among items belonging to the item type may be associated with the role, and the game event may be advanced while causing the operation character to use an item designated by the user from among the aptitude items that belong to the usable item type associated with the role assigned to the operation character and are made usable on the basis of the item-specifying information.

According to the above configuration example, for example, by increasing the degree of freedom in role selection by increasing the number of aptitude information pieces, a state where the user is allowed to select a role in which a more powerful item is usable can be created. Accordingly, it is possible to expand the range of tactics that can be taken by the user, thereby improving the entertainment characteristics of the game.

(Configuration 4)

According to Configuration 4, in Configuration 3 described above, at least one aptitude information piece among the plurality of aptitude information pieces may be set in advance as initial aptitude information for the operation character.

According to the above configuration example, each of the plurality of the operation characters can be personalized.

(Configuration 5)

According to Configuration 5, in Configuration 4 described above, the information processing program may further cause the computer to, when the role assigned to the operation character corresponds to the initial aptitude information of the operation character, correct the item-specifying information associated with the role, such that the number of usable items is larger than that when the role does not correspond to the initial aptitude information.

According to the above configuration example, the user can be caused to consider assignment of roles in consideration of the initial aptitude information, thereby improving the entertainment characteristics regarding growth of the operation character.

(Configuration 6)

According to Configuration 6, in any one of Configurations 1 to 5 described above, a skill to give an effect to the game or the game event may be set for each of the plurality of roles.

According to the above configuration example, more options can be provided to the user to advantageously advance the game. In addition, even if the operation character is the same, the skill can be changed by changing the role, so that it is possible to enhance the tactical characteristics of the game by assigning a role having a skill corresponding to a game scene. Moreover, when a certain operation character is desired to have a certain skill, it is possible to provide motivation to try various combinations of characters in order to add the aptitude information piece for enabling assignment of the role for which this skill is set.

(Configuration 7)

According to Configuration 7, in any one of Configurations 1 to 6 described above, the information processing program may further cause the computer to, when the operation character associated with the special character satisfies a state change condition in the game, change a state of the operation character from a first state to a second state.

(Configuration 8)

According to Configuration 8, in Configuration 7 described above, by associating a state change item for changing the state of the operation character from the first state to the second state in the game, a special character corresponding to the state change item may be associated with the operation character.

According to the above configuration example, it is possible to present, to the user, a situation in which the operation character and the special character are associated with each other via the state change item.

(Configuration 9)

According to Configuration 9, in Configuration 7 described above, when the operation character is in the first state, the game event may include a representation using the operation character and the special character associated with the operation character, and when the operation character is in the second state, the game event may include a representation using the operation character whose appearance has been changed on the basis of the special character.

According to the above configuration example, different representations can be presented to the user when the operation character is in the first state and when the operation character is in the second state. In addition, the content of the representation can change depending on the combination of the operation character and the special character associated with the operation character. Therefore, it is possible to provide motivation to the user to try various combinations of operation characters and special characters, thereby improving the entertainment characteristics of the game.

(Configuration 10)

According to Configuration 10, in Configuration 7 described above, when the parameter is updated on the basis of the progress of the game, the parameter may be updated such that the aptitude information addition condition is more easily satisfied when the operation character is in the second state than when the operation character is in the first state.

According to the above configuration example, it is possible to provide motivation to the user to actively utilize the above second state.

(Configuration 11)

According to Configuration 11, in Configuration 7 described above, when the operation character is in the first state, the game event may be advanced using an item designated by the user among use item candidates including an aptitude item belonging to an item type usable by the operation character among first owned items and not including a second owned item, and when the operation character is in the second state, the game event may be advanced using an item designated by the user among use item candidates including the aptitude item and further including the second owned item regardless of the item type usable by the operation character.

According to the above configuration example, the first owned item is presented as a use candidate in the first state, and the second owned item is presented as a use candidate in addition to the first owned item in the second state. Therefore, the second state can be a state where there are more options for use candidates than in the first state. Accordingly, it is possible to expand the range of tactics by causing the second state, and it is also possible to cause the user to consider, for example, when it is effective to change to the second state, thereby improving the strategic characteristics of the game.

(Configuration 12)

According to Configuration 12, in any one of Configurations 1 to 11 described above, the game event may be a battle event between the operation character and an enemy character, and the game event may be advanced in accordance with a superiority relationship between an item type of the item designated by the user as an item to be used by the operation character and an item type of an item to be used by the enemy character.

According to the above configuration example, in a battle with the enemy character, a situation in which the result of the game event can be affected by the superiority relationship between the items to be used can be created. In addition, by increasing the number of roles that can be assigned by adding the above aptitude information piece, the number of choices for items to be used can also be increased. Thus, for example, by changing the role for an enemy character with which a superiority relationship is poor, a weapon having a good superiority relationship with the enemy character can be made usable, whereby it is possible to expand the range of tactics that can be taken by the user.

(Configuration 13)

According to Configuration 13, in any one of Configurations 1 to 12 described above, the information processing program may further cause the computer to update the parameter regardless of the progress of the game when a special condition regarding the special character is satisfied.

According to the above configuration example, the convenience of the user can be improved by increasing the number of means by which the parameter can be updated. In addition, for example, even when role change is desired to be urgently performed but an aptitude information piece corresponding to a role to which change is desired to be made is not included, the parameter can be urgently updated due to the presence of such means, and as a result, it is also possible to serve as a relief function for the user; for example, role change is enabled by adding the aptitude information piece.

(Configuration 14)

According to Configuration 14, in any one of Configurations 1 to 13 described above, the information processing program may further cause the computer to, when the parameter related to the operation character and the special character associated with the operation character satisfies the predetermined condition, execute a conversation event in which the operation character and the special character appear.

According to the above configuration example, the user can be entertained by providing a conversation with various combinations of operation characters and special characters. Furthermore, by including a content of suggesting addition of the aptitude information piece or the like in such a conversation, the aptitude information piece can be added without an uncomfortable feeling.

(Configuration 15)

According to Configuration 15, in any one of Configurations 1 to 14 described above, the game may be a turn-based strategy game.

According to the above configuration example, it is possible to further improve the strategic characteristics of the turn-based strategy game, thereby enhancing the entertainment characteristics of the turn-based strategy game.

According to the exemplary embodiments, it is possible to provide a game having high entertainment characteristics in which a game nature in which a large number of characters appear and a role setting element for each character are combined.

BRIEF DESCRIPTION OF THE DRAWINGS

FIG. 22 illustrates a non-limiting example of the data structure of own army character master data 502;

FIG. 23 illustrates a non-limiting example of the data structure of ring master data 505;

FIG. 24 illustrates a non-limiting example of the data structure of owned character data 510;

FIG. 25 illustrates a non-limiting example of the data structure of bond data 5104;

DETAILED DESCRIPTION OF NON-LIMITING EXAMPLE EMBODIMENTS

Hereinafter, an exemplary embodiment will be described.

[Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
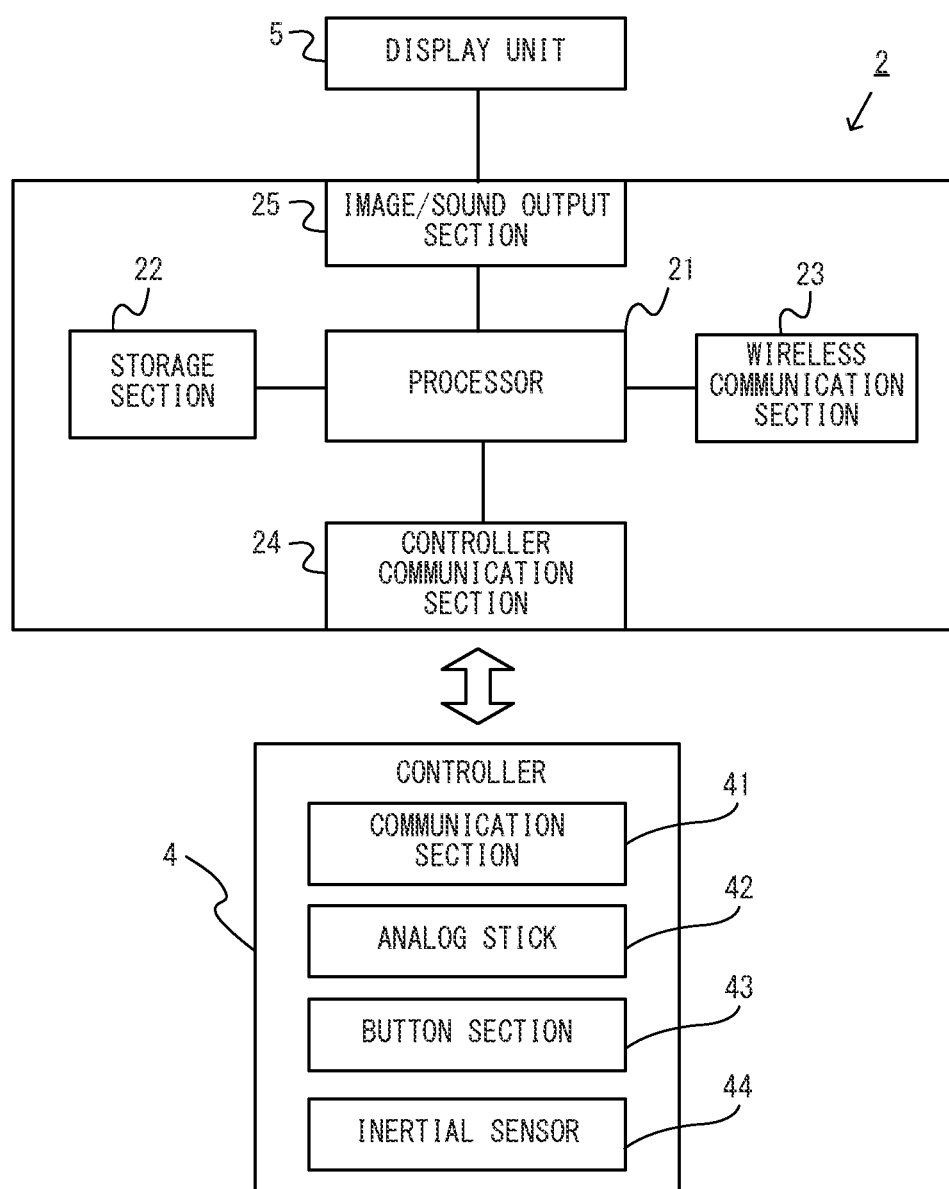
FIG. 1 is a block diagram showing the hardware configuration of a game apparatus 2.

FIG. 1 is a block diagram showing an example of the internal configuration of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 or a predetermined server device. As this wireless communication, for example, internet communication or short-range wireless communication is used.

The game apparatus 2 also includes a controller communication section 24 for the game apparatus 2 to perform wired or wireless communication with a controller 4.

Moreover, a display unit 5 (for example, a television or the like) is connected to the game apparatus 2 via an image/sound output section 25. The processor 21 outputs an image and sound generated (for example, by executing the above information processing) to the display unit 5 via the image/sound output section 25.

Next, the controller 4 will be described. Although not shown, the controller 4 of the exemplary embodiment has a housing having a vertically long shape, and can be held in the orientation in which the housing is vertically long. The housing has a shape and a size that allow the housing to be held with one hand when the housing is held in the orientation in which the housing is vertically long.

The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons. For example, the controller 4 may include a plurality of operation buttons on a main surface of the housing.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 24. The content of a direction input to the analog stick 42, information indicating a pressed state of the button section 43, and various detection results by the inertial sensor 44 are repeatedly outputted to the communication section 41 and transmitted to the game apparatus 2 at appropriate timings.

[Game Assumed in Exemplary Embodiment]

Next, game processing executed in the exemplary embodiment will be described. As an assumption thereof, the outline of a game assumed in the exemplary embodiment will be described. The game assumed in the exemplary embodiment is a turn-based strategy type simulation game (hereinafter, referred to as TBSG). In addition, in the exemplary embodiment, a TBSG in which a total of two armies that are one own army and one enemy army battle against each other is assumed. In this TBSG, pieces in the simulation game are referred to as "characters". Furthermore, characters of the own army are referred to as "own army characters", and characters of the enemy army are referred to as "enemy army characters".

Moreover, the game is divided into a story part and a battle part. In the story part, a predetermined story is presented to the user, and events, etc., in which various characters can be caused to become fellows, also occur. That is, the user can increase the number of own army characters by causing various characters to become fellows while advancing the story in the story part. In the game, there are no identical (overlapping) army characters.

Figure 2:
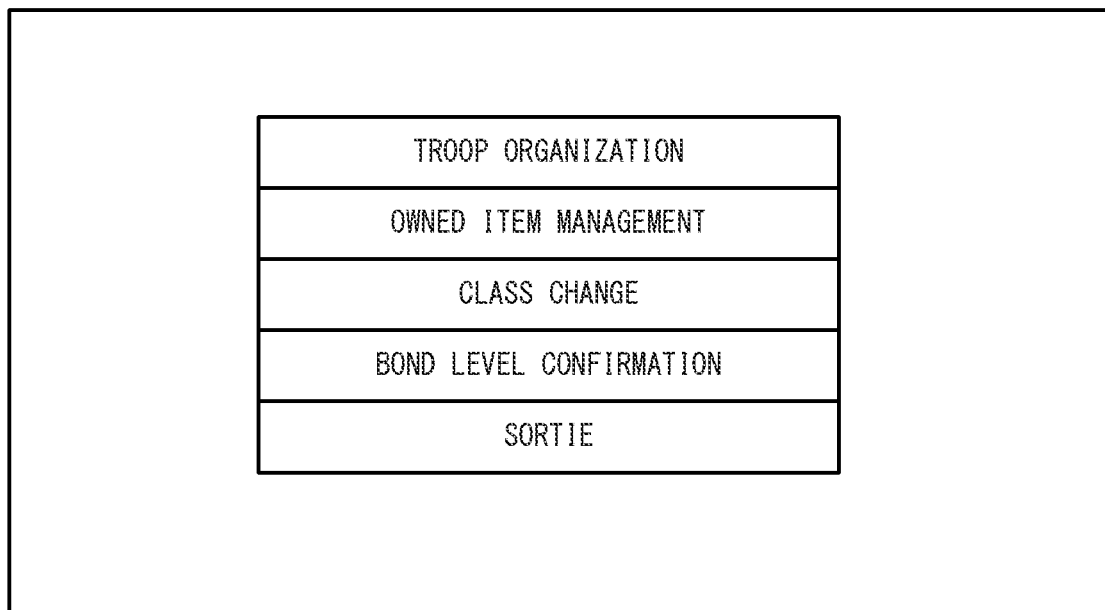
FIG. 2 illustrates a non-limiting example of a game screen.

Meanwhile, in the battle part, TBSG type game processing is executed using a predetermined map (hereinafter, referred to as battle map). Hereinafter, the rough flow of the game progress of the battle part assumed in the exemplary embodiment will be briefly described using screen examples. The processing of the battle part is largely divided into a "preparation screen process" and a "TBSG type game process (battle map process)". When the battle part starts, first, a preparation menu is displayed as shown in FIG. 2. In the preparation menu, five items (options) including "troop organization", "owned item management", "class change", "bond level confirmation", and "sortie" are shown. Hereinafter, each item will be briefly described.

When the user selects "troop organization", the preparation menu transitions to a troop organization screen (not shown). In this screen, the user can select own army characters to be caused to sortie to the battle map, and organize a troop. The maximum number of sorties can vary depending on the battle map.

Figure 3:
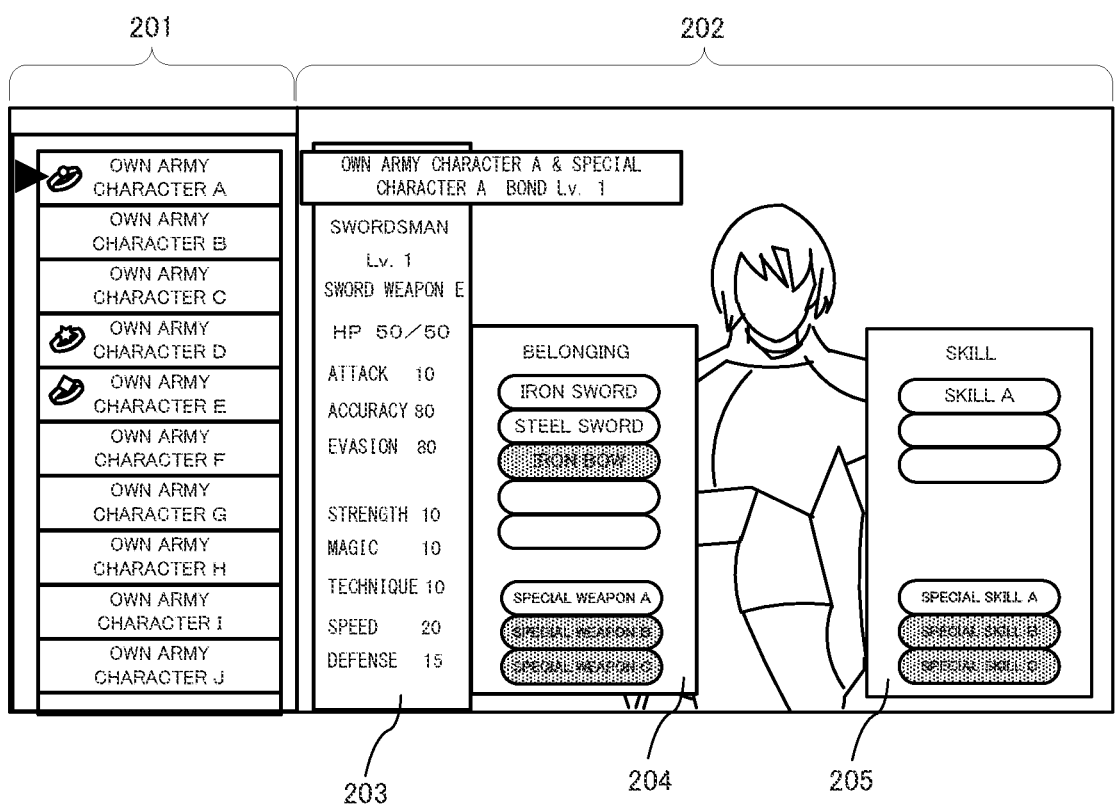
FIG. 3 illustrates a non-limiting example of the game screen.

Moreover, when the user selects "owned item management" from the preparation menu, the user can manage belongings of each own army character. FIG. 3 shows an example of an owned item management screen. This screen also serves as a status screen for each own army character. As shown in FIG. 3, the status and the belonging state of any own army character selected by the user from an own army character list displayed in a left pane 201 are displayed in a right pane 202. The right pane 202 includes a status display portion 203, a belonging display portion 204, a skill display portion 205, and an image of a currently selected own army character is also displayed in the background thereof. In the status display portion 203, the name and status information of the own army character are shown. In the belonging display portion 204, items currently owned by the own army character are displayed. The term "item" in the exemplary embodiment is a concept of a general term for consumable tools such as so-called recovery medicines and treasure chest keys, equipment items such as weapons and armors, and items that can be converted into in-game currency such as gold bars. In the skill display portion 205, skills that are usable by the own army character are displayed. A skill is a skill that can generate an effect advantageous for the user when being used in a predetermined scene in the game. For example, by using a skill when attacking an enemy army character, more damage can be given to the enemy army character.

Here, in the above belonging display portion 204, eight frames are displayed, and five frames out of the eight frames are frames showing currently owned belongings (hereinafter, referred to as normal frames). The three frames on the lower side are frames showing "special weapons" described later (hereinafter, referred to as special weapon frames). In the following description, items that can be displayed in the above normal frames are referred to as "normal items", and are distinguished from special weapons and rings described later. In addition, as indicated by the fact that the number of normal frames is five, in the exemplary embodiment, the number of normal items that can be owned by each own army character is up to five.

Moreover, as for the frames displayed in the skill display portion 205, the five frames on the upper side show normal skills currently owned by the own army character, and the three frames on the lower side show special skills that are skills specific to special weapons described later. In addition, in the exemplary embodiment, normal skills are set according to each class.

The user can set a normal item to be owned by an own army character, by performing a predetermined operation on the owned item management screen. That is, any normal item selected by the user can be set as a belonging of a predetermined own army character (owning of a special weapon will be described later).

Figure 4:
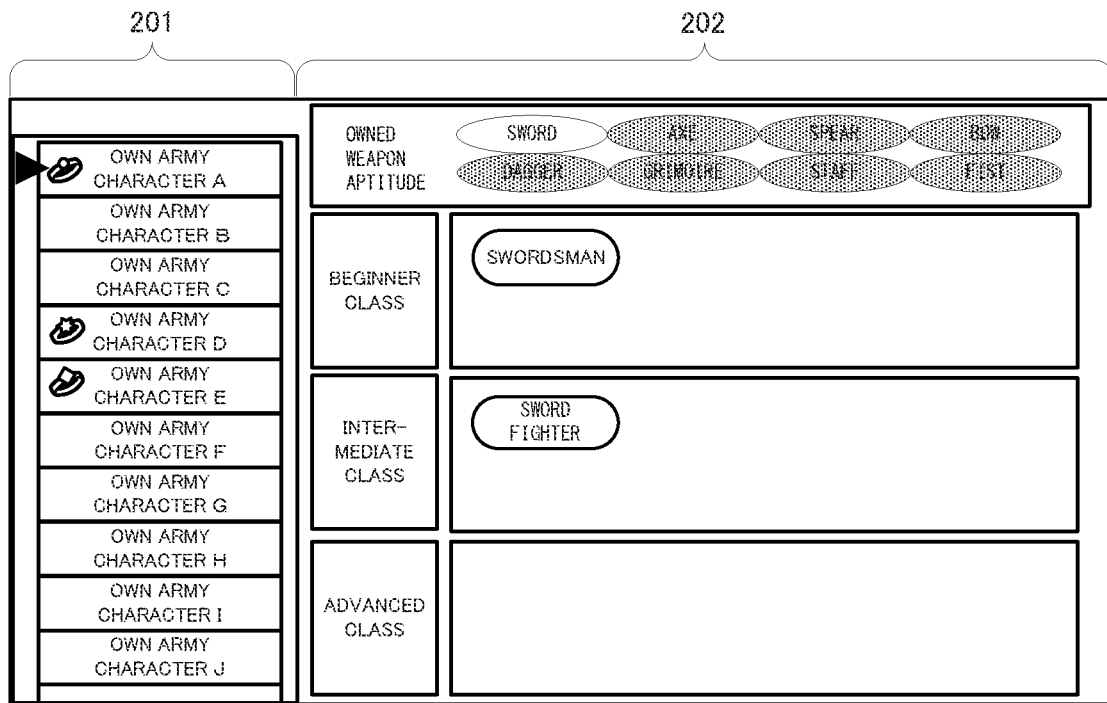
FIG. 4 illustrates a non-limiting example of the game screen.
Figure 5:
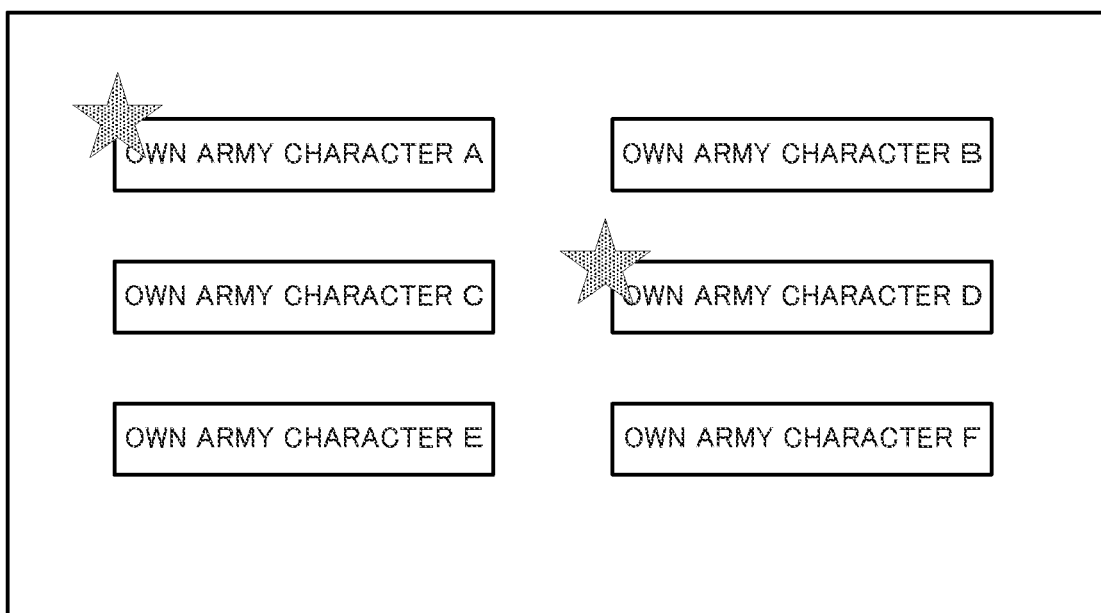
FIG. 5 illustrates a non-limiting example of the game screen.

Referring back to FIG. 2, when the user selects "class change" from the preparation menu, the preparation menu transitions to a screen for performing class change, as shown in FIG. 4, in which class change of the own army character can be performed. In addition, when the user selects "bond level confirmation" from the preparation menu, a screen is displayed as shown in FIG. 5, and a bond level of each own army character can be confirmed therein. The class change and the bond level will be described in detail later.

Moreover, when the user selects "sortie" from the preparation menu, the preparation screen process ends, and the processing shifts to the battle map process.

Figure 6:
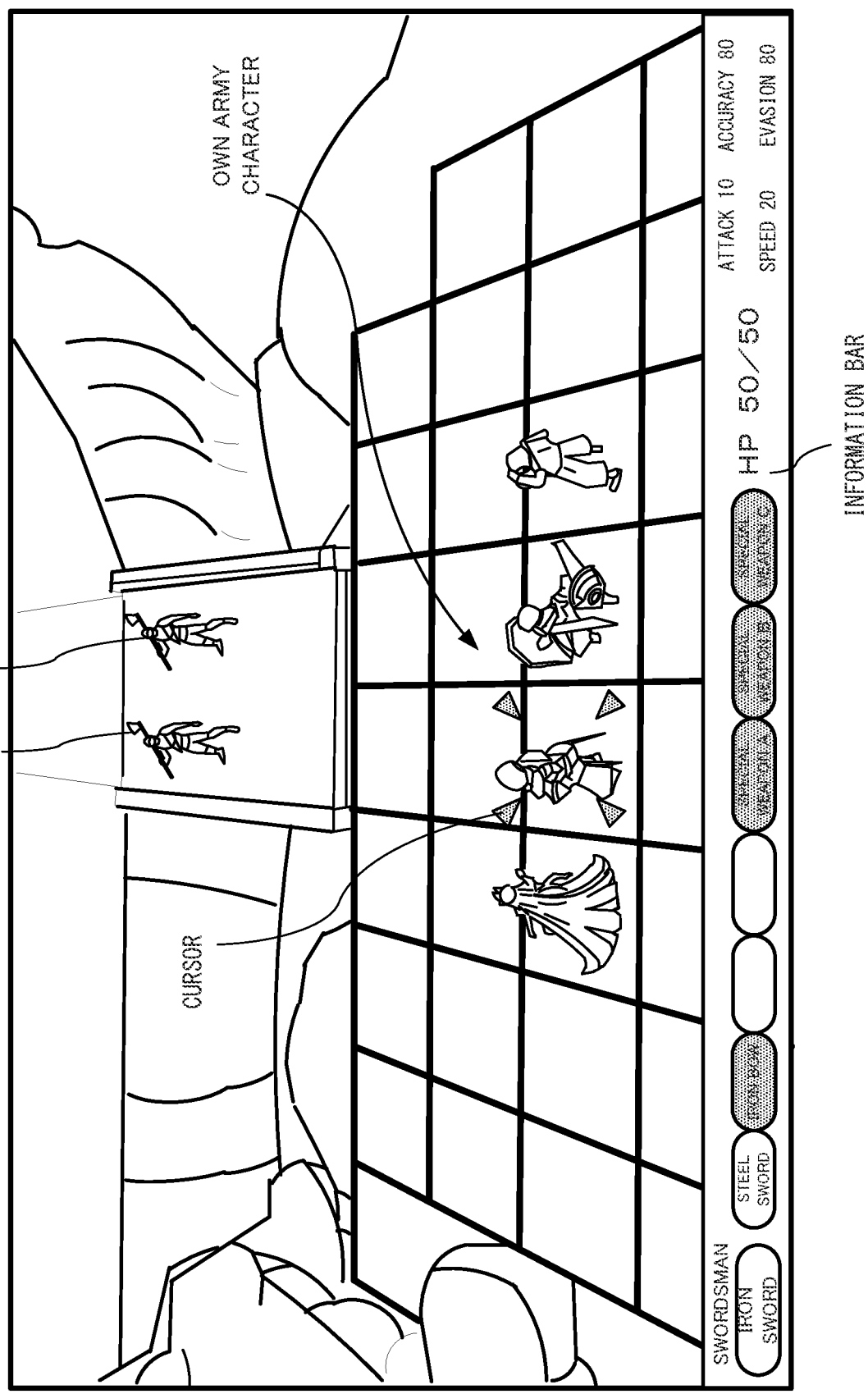
FIG. 6 illustrates a non-limiting example of the game screen.

FIG. 6 shows an example of a game screen in the battle map process. In the exemplary embodiment, the battle map is composed of a set of "cells" which are quadrangular (square) areas. The cells are arranged in a grid pattern, and one cell is a minimum movement unit for each character. In addition, in the screen example in FIG. 6, four own army characters and two enemy army characters are displayed. Moreover, an information bar is also displayed at a lower portion of the screen. The information bar shows information regarding an own army character currently selected as an operation target (on which a cursor is placed). The elements displayed in the information bar will be described later.

Next, a battle system in the battle map will be described. In the game, an own army character can be caused to move and attack an enemy character within a range set for each weapon owned by the own army character. When attacking, the user needs to select one weapon to be used for each attack, from the weapons owned by the own army character that is an operation target. For example, the case where the own army character owns three weapons, an "iron sword", a "steel sword", and an "iron bow", is assumed. In this case, when the user selects "attack" from a command list shown in FIG. 7, a use weapon selection window is displayed as shown in FIG. 8. In this window, the weapons owned by the own army character are displayed in a list. By selecting any of the weapons from this window, the user can cause the own army character to attack an enemy character using this weapon. In FIG. 8, the "iron bow" is grayed out, indicating that this weapon cannot be selected, which will be described later.

[Weapon]

Here, the "weapons" in the game will be described. In the game, for each weapon, a parameter called "rank" indicating the performance and the level of the attack power of the weapon is provided. In the game, there are five ranks, S, A, B, C, and D in descending order of rank. For example, in the above example, the rank of the "iron sword" is D rank, and the rank of the "steel sword" is C rank. In this case, the "steel sword" is a weapon having higher attack power.

[Weapon Type]

In the game, a plurality of types (weapon types) are provided for weapons. Specifically, weapons are classified into eight types, that is, sword, axe, spear, bow, dagger, grimoire, staff, and fist. In addition, weapon types that can be used for attack and weapon types that cannot be used for attack are set depending on "class" described later. An own army character can own types of weapons that cannot be used for attack. However, in the use weapon selection window shown when attacking in the battle map, for example, such weapons are grayed out such that the weapons cannot be selected by the user. In other words, an own army character can perform an attack using a weapon type that matches the own class, among the weapons owned by the own army character. In the example in FIG. 8, the "iron bow" is grayed out, indicating that the "iron bow" is owned but cannot be used for attack. In the following description, as a general term for weapons by weapon type, weapons are sometimes referred to as "sword weapon", "axe weapon", or the like.

[Class]

Next, the "class" described above will be described. Class is a concept that indicates the role of the character during a battle, such as a type of army person and occupation. In the game, there are a plurality of classes, and one useable weapon type is set for each class. For example, as examples of classes, there are swordsman (sword), soldier (axe), lancer (spear), archer (bow), wizard (grimoire), monk (staff), robber (dagger), and fighter (fist) (the inside of parentheses for each class indicates a usable weapon type).

Moreover, for the same weapon type, a plurality of classes are prepared. For example, as classes for which a weapon type is set to sword, there are a plurality of classes such as swordsman, sword fighter, and sword master. In addition, each class is classified as any of beginner class, intermediate class, and advanced class. When the level of an own army character is low, only beginner class can be selected, and as the level of the own army character is raised, intermediate class and advanced class are released stepwise. In the following description, the classes corresponding to each weapon type are sometimes referred to collectively as "sword class", "axe class", or the like.

For each class, a parameter called "weapon level" is also set. The weapon level is a parameter indicating the rank of a weapon usable at the class. For example, a "weapon level D" indicates that a weapon having a weapon rank D or lower is usable. In addition, a "weapon level A" indicates that a weapon having a weapon rank A or lower is usable. A "weapon rank S" indicates that weapons of all ranks are usable. In a more specific example, it is assumed that there are two sword classes that are swordsman and sword master. In this case, if the weapon level of swordsman is D and the weapon level of sword master is A, swordsman can use only sword weapons having rank D or lower, and sword master can use all sword weapons having rank A or lower.

In the game, for (classes corresponding to) some weapon types, an advantageous weapon type and a disadvantageous weapon type are set. For example, correction is performed such that swords have an advantage over axes, axes have an advantage over spears, and spears have an advantage over swords. In a more specific example, an attack with a spear weapon (spear class) has an advantage over sword class, and an attack with an axe weapon has an advantage over spear class. Also, when the above relationship is described oppositely, sword weapons have a disadvantage over spear class. For example, when an attack with a sword weapon is performed against spear class, correction is performed such that given damage is less than normal. Therefore, by attacking an enemy character with a weapon type having an advantage over the weapon type (class) of the enemy character, it is also possible to make the game development more advantageous.

[Class Change]

Next, class change in the game will be described. In the game, for each own army character, a predetermined class corresponding to an initial aptitude described later is set as an initial class. As the game is advanced, the class of the own army character can be changed to another class. However, from the beginning, the class cannot be changed to all classes. In the game, a "necessary aptitude" is set for each class. The necessary aptitude indicates a weapon aptitude required to become the class. In the game, the usable weapon type that is set for each class described above is the necessary aptitude. In other words, for an own army character, a class to which class change can be performed is determined according to the weapon aptitude of the own army character.

Here, the above weapon aptitude will be described. The weapon aptitude is a parameter indicating a weapon type usable by each own army character. In the game, any one weapon type is assigned as an "initial aptitude" to each own army character. For example, it is assumed that an own army character A has "sword aptitude" as an initial aptitude, and an own army character B has "axe aptitude" as an initial aptitude. In this case, only the class of the own army character A can be changed to "sword fighter" which is a sword class for which "sword aptitude" is set as a necessary aptitude, and the class of the own army character B cannot be changed thereto.

In the game, the above normal skill is set for each class. For example, as the normal skill for each class, "sword skill A" is set for "swordsman", "bow skill A" is set for "archer", and "sword skill A" and "sword skill B" are set for "sword fighter". Therefore, by changing the class through class change, the normal skill of the own army character can also be changed.

[Outline of Game Processing Control in Exemplary Embodiment]

Next, the outline of game processing control according to the exemplary embodiment will be described with the above game as an example. The control described in the exemplary embodiment mainly includes control for weapons usable during a battle and control for weapon aptitudes of the above own army characters.

First, the outline of control for usable weapons will be described. In the game, there is an adornment item called "ring". The ring is an item that is not handled as the above normal item (not displayed in the above belonging display portion 204), but can be "worn" by an own army character in the above owned item management screen. In addition, in the above owned item management screen, it is also possible to exchange rings between own army characters on the basis of an operation of the user.

As the above ring, there are various types, and rings can be obtained in the story part, as a reward in the battle map, etc. Therefore, as in the case of the above own army characters, the number of rings owned can be increased as the game proceeds. In addition, in the game, there is a concept of a special character and a special weapon that are fixedly associated with each ring. For example, one special character A is associated with a ring A, and three special weapons A1, A2, and A3 are associated with the ring A. Moreover, in the game, the weapon types of a plurality of special weapons associated with one ring are the same. The special character is a character inhabiting the ring, and the special weapons are weapons owned by the special character. In addition, the special character is a character that cannot be directly used as a "piece" in the above battle map. Moreover, since each ring in the game has a character nature as described above, there are no rings of the same type. In other words, (as with the own army characters), there are no identical special characters. Also, as for the special weapons, different special weapons are set for each ring, and there are no identical special weapons. In this regard, in another exemplary embodiment, as for the special weapons, there may be some weapons that overlap between a plurality of rings (e.g., weapons with the same name).

In the game, the number of rings that can be worn by each own army character is only one. In addition, since it is possible to exchange rings between own army characters, it is possible to change a combination of an own army character and a ring (special character). That is, it is possible to associate a ring itself with any own army character, but the number of own army characters with which a ring can be associated at the same time is only one.

Figure 9:
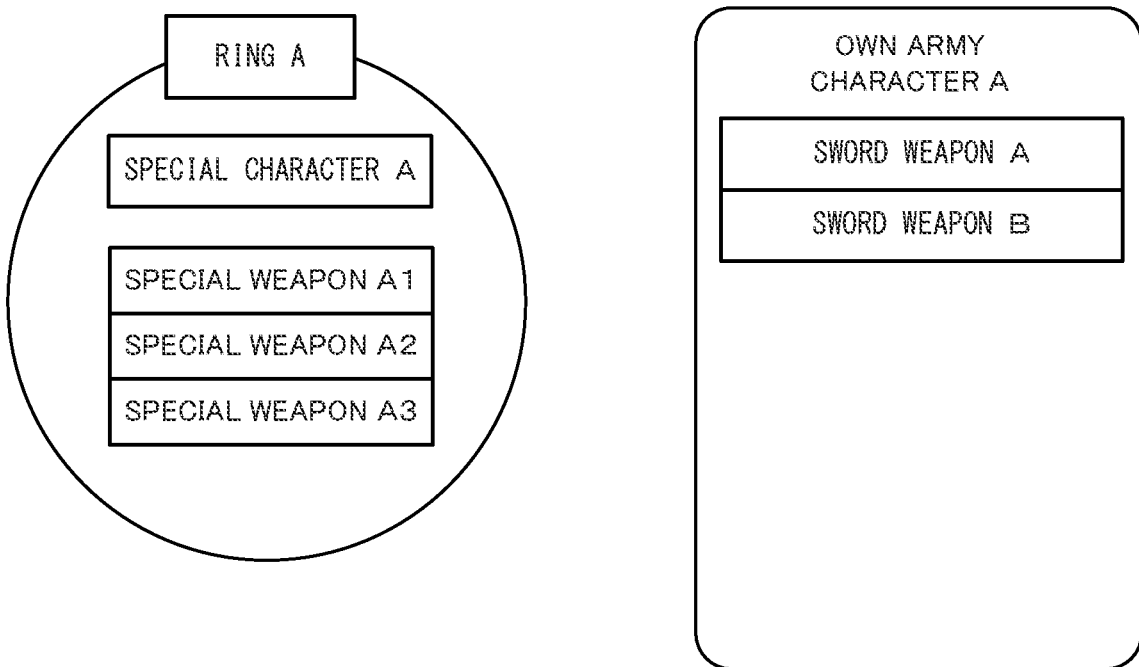
FIG. 9 illustrates a ring, special weapons, and integration.
Figure 10:
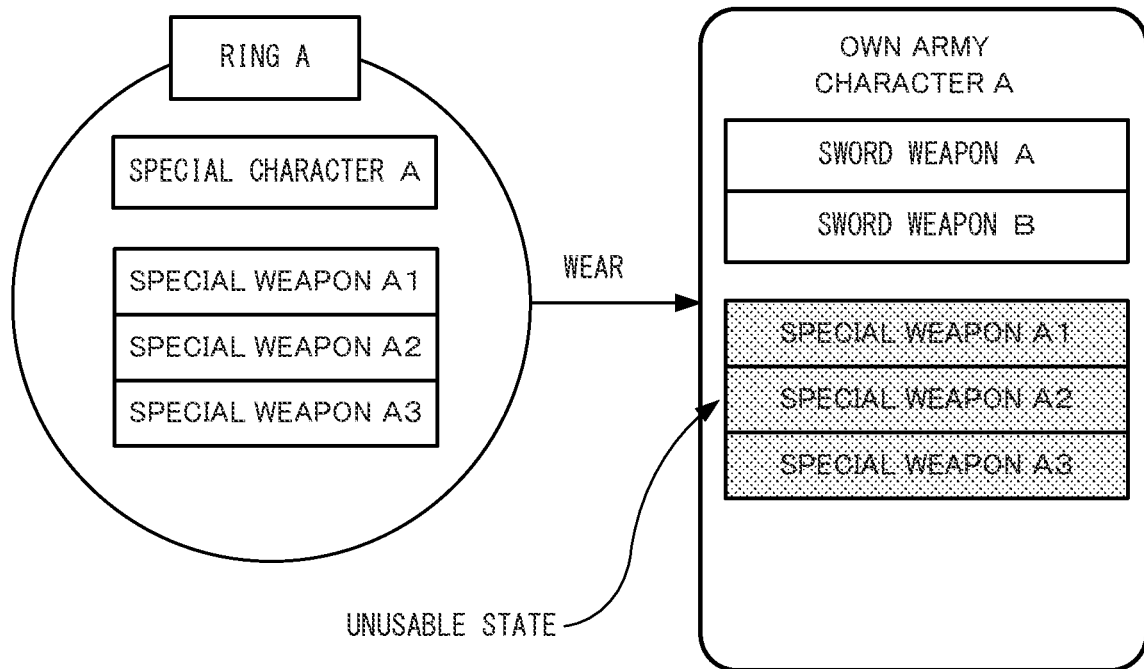
FIG. 10 illustrates the ring, the special weapons, and the integration.

An own army character wearing a ring owns a special weapon associated with the ring. FIG. 9 and FIG. 10 are schematic diagrams showing an owned state of a special weapon before and after a ring is worn. Each of these drawings conceptually shows the ring A on the left side and conceptually shows the own army character A on the right side. FIG. 9 shows a state where the own army character A does not wear the ring A. In this state, the belongings of the own army character A are only two belongings that are a sword weapon A and a sword weapon B. Meanwhile, when the own army character A wears the ring A, the state of the own army character A is changed to a state where the own army character A owns the special weapons A1 to A3 associated with the ring A, as shown in FIG. 10. In other words, when a ring is worn, special weapons associated with the ring are owned. In addition, for example, when the own army character A removes the worn ring A and the own army character B wears the ring A, the special weapons associated with the ring A are passed from the own army character A to the own army character B.

In a state where the own army character A wears the ring A as described above, when a predetermined condition is satisfied in the battle map, the state of the own army character A can be changed on the basis of the ring A. This change is a change based on the special character A associated with the ring A. For example, the appearance of the own army character A is changed such that the special character A possesses the own army character A or the special character A and the own army character A are combined. In addition, various parameters such as HP and attack power are temporarily increased. In this example, this change is referred to as "integration". When a predetermined condition is satisfied in the battle map, it is made possible for the user to perform an operation (integration operation) for instructing integration for the own army character A (in other words, an integration operation cannot be performed unless the predetermined condition is satisfied). In this example, the predetermined condition is that "integration points" are accumulated to a maximum value. The number of integration points is increased by actions in the battle map. In the game, at the start of the battle map, the number of integration points is the maximum value. That is, the battle map starts in a state where integration is possible immediately after the start of the battle map. Then, when the user performs the integration operation, a representation in which the own army character A and the special character A are integrated is displayed. This representation is displayed, for example, as a cut-in animation or the like. Then, after the integration representation, the appearance of the own army character A is changed. Specifically, the appearance of the own army character A is changed to an image corresponding to a character (hereinafter, referred to as integration character) obtained by integrating an image of a character in the status screen and an image of a character as a piece on the battle map. This image may be, for example, an image that is based on an image of an own army character and into which a part of the design of a special character is incorporated.

In the game, when three turns have elapsed after integration, the integration is canceled. When the integration is cancelled, the number of integration points becomes a minimum value (initialized).

Figure 11:
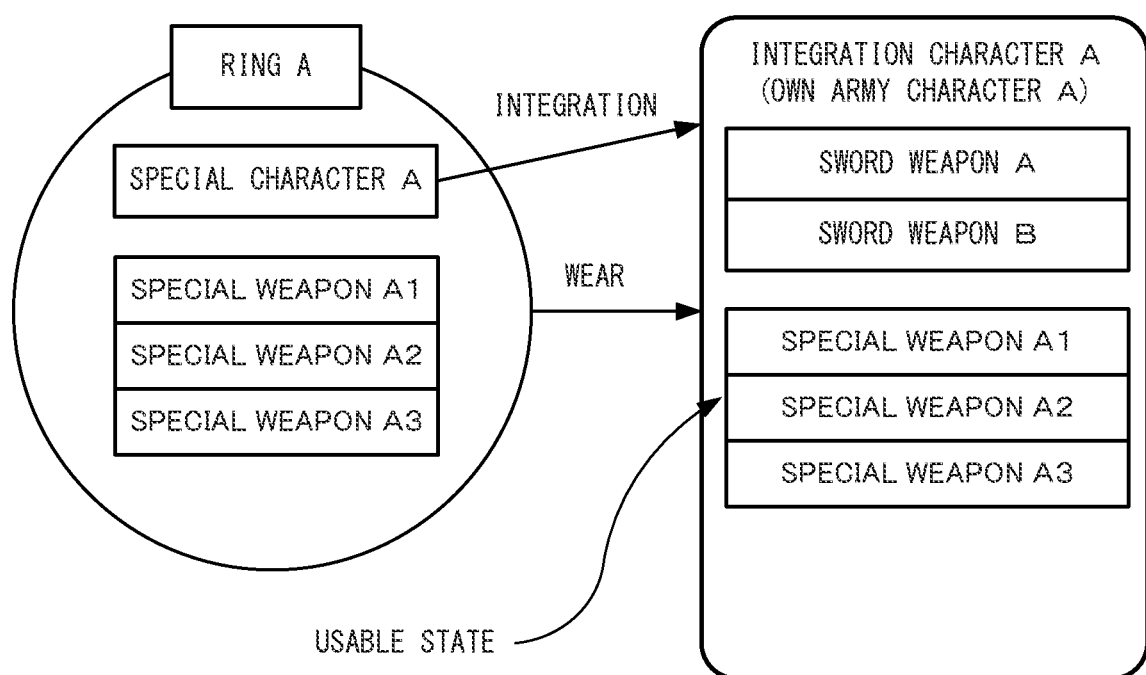
FIG. 11 illustrates the ring, the special weapons, and the integration.

Meanwhile, in the game, as shown in FIG. 10, when the ring is worn, the special weapons are owned, but cannot be used in the battle map unless integration is performed. That is, during integration, it is possible to temporarily use the special weapons. FIG. 10 shows a state where the ring is worn but integration has not been performed. Therefore, this state is a state where the special weapons are owned but cannot be used in an attack. Meanwhile, FIG. 11 conceptually shows a state where the own army character A and the special character A are integrated. FIG. 11 shows that the special weapons A1, A2, and A3 become usable as a result of integration. In this case, even when the weapon type of each of the special weapons is a weapon type that is originally not usable at the class of the own army character A, the special weapons become usable. That is, during integration, the special weapons become usable regardless of the combination of class and weapon type. For example, the case where the ring A is worn by the own army character A is assumed. In addition, the special character A, the special weapon A1, the special weapon A2, and the special weapon A3 are associated with the ring A. The class of the own army character A is swordsman, and the own army character A can use sword weapons. In addition, the special weapons are all axe weapons. In this case, the class of an integration character A is still swordsman, and the weapons that are originally usable are only sword weapons, but while being an integration character, the special weapon A1, the special weapon A2, and the special weapon A3 which are axe weapons also become usable. In particular, in the game in which there is a relationship of advantageous weapon type/disadvantageous weapon type weapons as described above, when an own army character having sword class attacks an enemy character having spear class, if integration has not been performed, the own army character has to attack using a sword weapon which has a disadvantage over spear class. However, in a state where integration with a special character whose special weapons are axe weapons has been performed, an attack can be made using the axe weapons which has an advantage over spear class. Therefore, by utilizing integration, the user can expand the (temporarily) usable weapon types and can broaden the range of strategies.

Here, the differences on the screen display between the case where the own army character is not wearing the ring, the case where the own army character is wearing the ring, and a state where the own army character has been integrated, will be described. First, the belonging management screen (status screen) shown in FIG. 3 will be described. In this screen, in the own army character list in the left pane 201, a ring icon is displayed next to the name of each own army character wearing a ring. FIG. 3 shows a state where the own army character A wearing the ring A is selected. When the ring is worn, the names of the special weapons are displayed in the special frames in the belonging display portion 204.

In the game, a special skill specific to each special weapon is also set. As with the special weapons, this special skill is also a skill that is usable only during integration. When the ring is worn, the special skills are displayed in the skill display portion 205.

Figure 12:
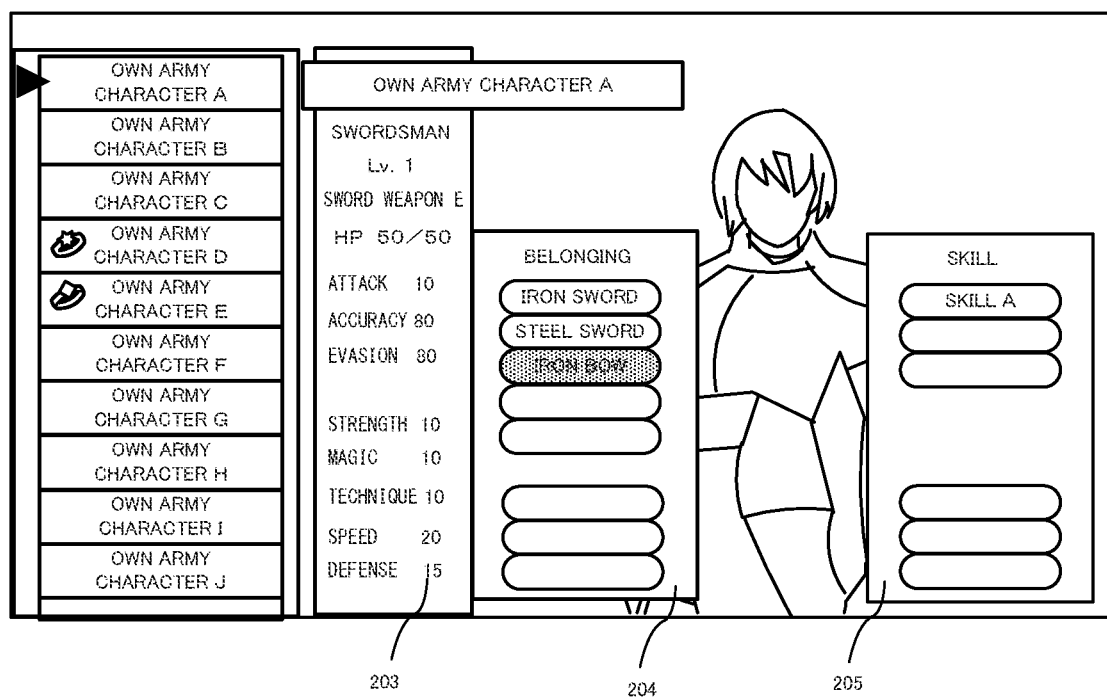
FIG. 12 illustrates a non-limiting example of the game screen.

FIG. 12 shows an example of the belonging management screen in the case where the own army character A is not wearing the ring. In FIG. 12, all the special weapon frames are blank. In the skill display portion 205 as well, no special skill is displayed, and each frame for a special skill is blank.

While the ring is being worn, the name of the own army character is also changed. In the above example, in the case of FIG. 3 in which the ring is worn, the names of two characters are displayed side by side, such as "own army character A & special character A", as shown near the upper end of the status display portion 203. Meanwhile, in the case of FIG. 12 in which no ring is worn, only the name of the own army character A is displayed. In the game, the character image displayed in the background of the status screen remains unchanged before and after the ring is worn. However, in another exemplary embodiment, when the ring is worn, images of the special characters may also be displayed together.

Next, the differences on the screen display in the battle map will be described. First, a character image displayed as a "piece" on the battle map is replaced with an image of an integration character when integration has been performed as described above. The same image is used for the case where integration has not been performed and a ring is merely worn and the case where no ring is worn.

In the screen of the battle map shown in FIG. 6, the information bar is displayed at the lower portion of the screen. In the information bar, information regarding belongings is shown in a substantially left half, and simple status information is shown in a substantially right half. More specifically, for the information regarding belongings, a total of eight frames are displayed, and the leftmost frame shows a currently used (equipped) weapon. In the example of FIG. 6, the name of each weapon is displayed as letters, but each weapon may be displayed as an image such as a weapon icon. In addition, the second to fifth frames from the left show the owned state of the belongings (normal items) other than the special weapons. If these frames are blank, it indicates that no item is owned. Moreover, the three frames on the right side show currently owned special weapons. In the example of FIG. 6, the information bar is an information bar related to the own army character wearing the ring, so that the names of the special weapons are displayed. However, when no ring is worn, these three frames are blank. Moreover, in the information bar in FIG. 6, weapons that cannot be used are shaded. In the actual screen, for example, such weapons are grayed out, thereby indicating that the weapons cannot be used. As described above, in the information bar, the current state of belongings including special weapons is displayed, so that the user can quickly grasp the battle ability and the weapon type of each own army character on the battle map (e.g., without opening a detailed screen).

Figure 7:
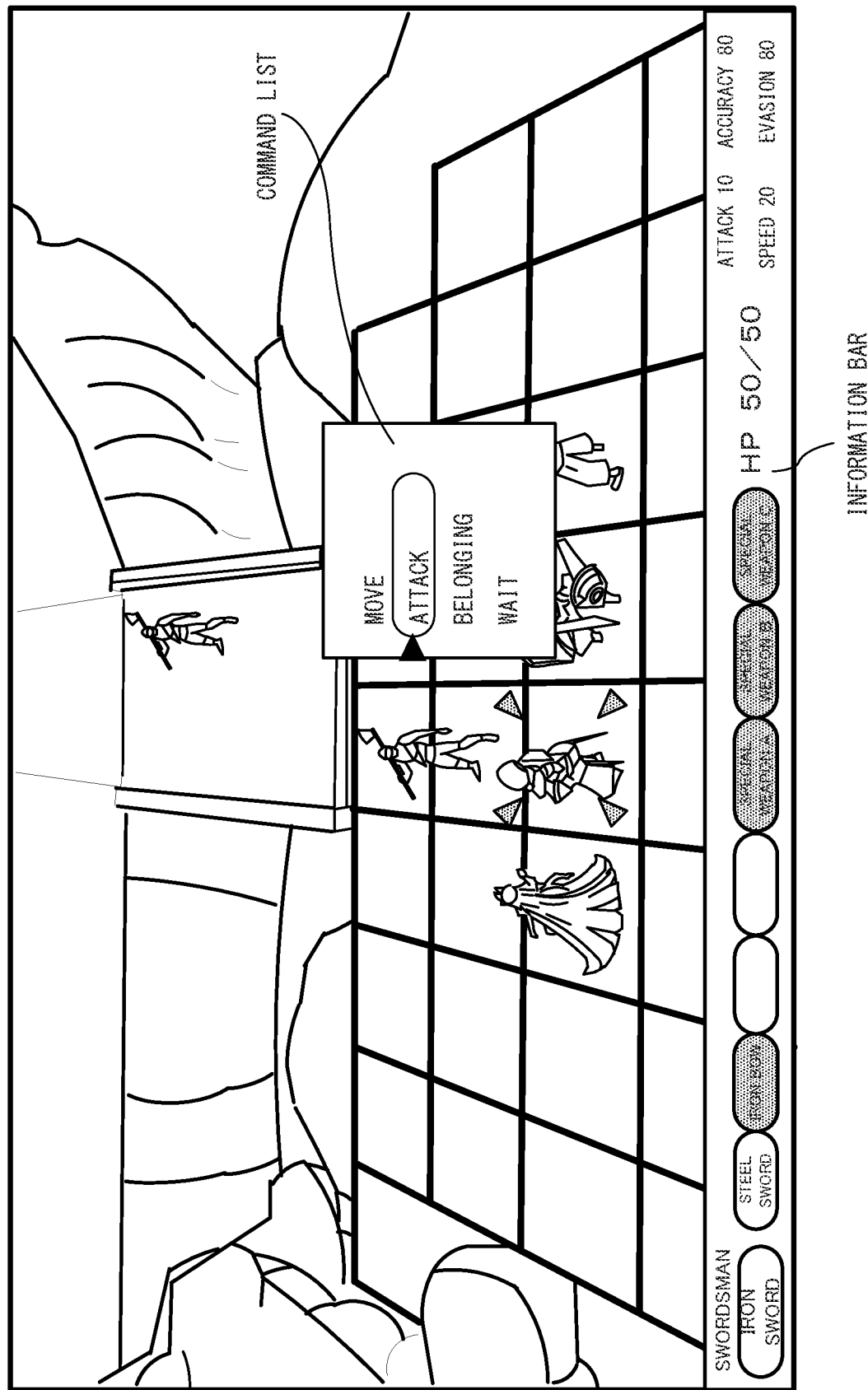
FIG. 7 illustrates a non-limiting example of the game screen.
Figure 8:
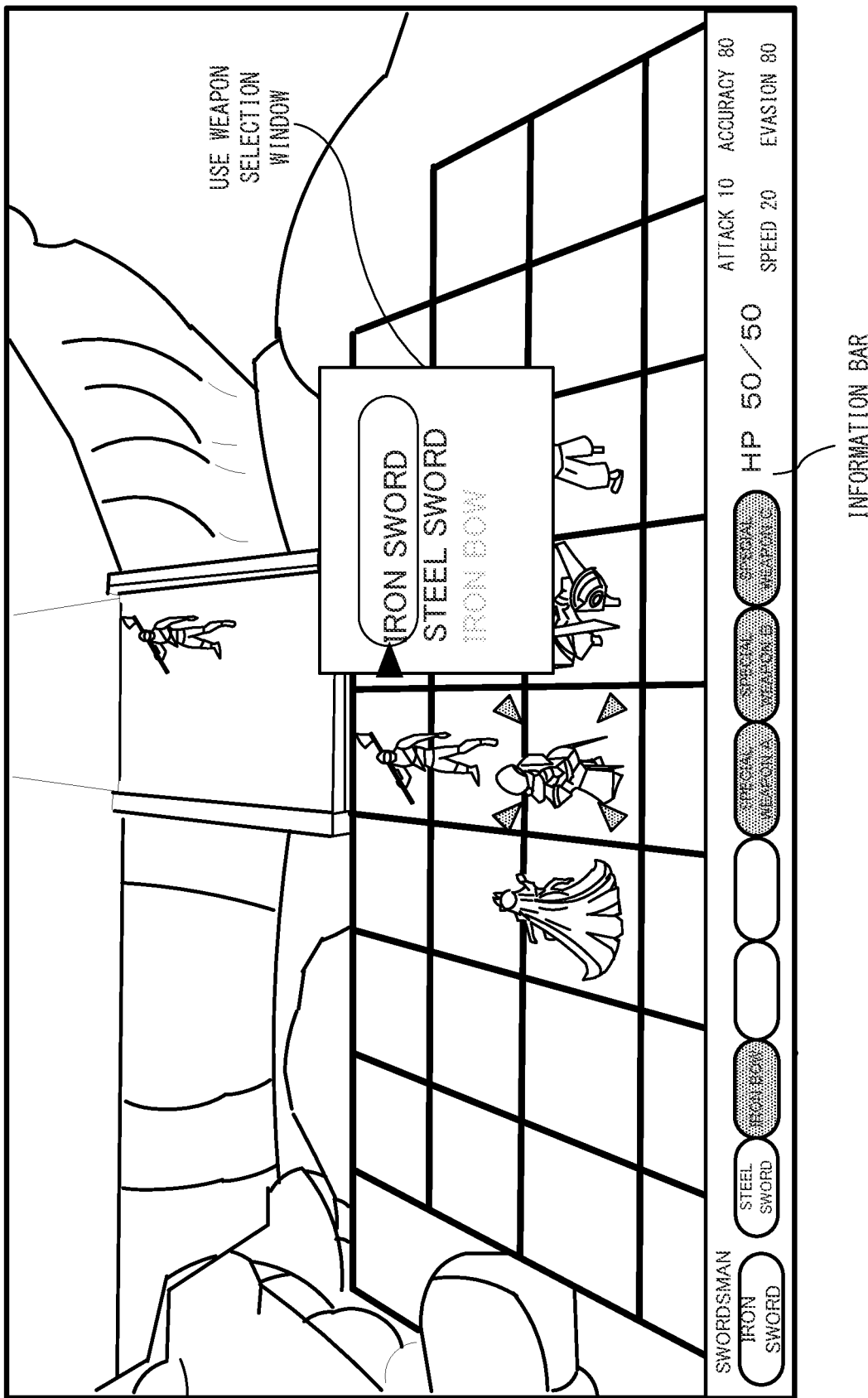
FIG. 8 illustrates a non-limiting example of the game screen.
Figure 13:
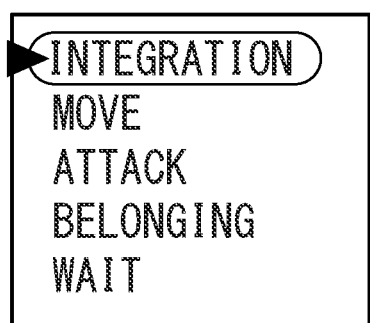
FIG. 13 illustrates a non-limiting example of display of a command list.
Figure 14:
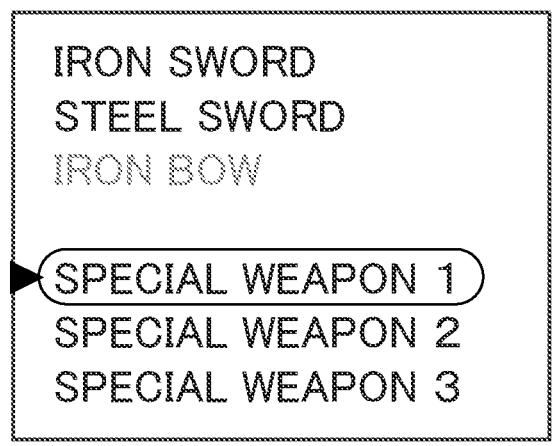
FIG. 14 illustrates a non-limiting example of display of a use weapon selection window.

As for the command list shown in FIG. 7, when integration is enabled, the display content is changed so as to include an integration command as shown in FIG. 13. In addition, during integration, the display content of the use weapon selection window is changed so as to include special weapons as shown in FIG. 14.

In the game, when an own army character attacks an enemy character, a battle animation is displayed (as a representation of a battle scene). As this animation, for example, an animation in which the own army character holds a weapon selected as described above in a hand thereof and tries to slash the enemy can be displayed. At this time, when integration has been performed, an animation in which the integration character tries to slash the enemy can be displayed. On the other hand, when integration has not been performed, if a ring is worn, an animation including two characters that are the own army character and a special character is displayed. For example, an animation in which the two characters attack together, or an animation in which only the own army character attacks and the special character cheers in the back, is displayed. Moreover, when no ring is worn, as a matter of course, an animation including no special character is displayed. As described above, as the battle animation, different animations can be displayed when no ring is worn, while a ring is being worn, and in a state where integration has been performed.

Meanwhile, in the game, not all of the above three special weapons can be used from the beginning even when integration is performed. In the game, for (a combination of) each own army character and each special character, a parameter called "bond level" is provided. The bond level is an index indicating the magnitude of the relation between the own army character and the special character. In the exemplary embodiment, the term "bond" is used, but in another exemplary embodiment, for example, "likability", "reliability", or the like may be used. The special weapons become usable stepwise as the bond level increases. For example, at bond level 1, only a special weapon A can be used; at bond level 5, a special weapon B becomes usable; and at bond level 10, a special weapon C also becomes usable. In another example, in the initial state (at bond level 1), none of the special weapons may be usable. In this case, for example, the special weapon A may become usable at bond level 3, the special weapon B may become usable at bond level 5, and the special weapon C may become usable at bond level 10. In addition, for example, in the initial state (at bond level 1), none of the special weapons may be usable, and at bond level 10, all of the special weapons A to C may become usable.

Next, the method for raising the bond level will be described. In the game, by satisfying a predetermined condition (hereinafter, referred to as bond increase condition) in the battle map, a "bond experience value" is increased, and when the bond experience value is increased to a certain value, the bond level can be raised. An example of the bond increase condition is to perform a battle in a state where a ring is worn. In addition, as for the bond experience value, even when the same action is performed, a higher value can be obtained if integration has been performed, than if integration has not been performed. For example, an own army character A wearing a ring A with which a special character A is associated is assumed. In this case, a "bond level" is provided for a combination of the special character A and the own army character A. When a battle is performed without integration, "1" is added as a bond experience value for this combination. On the other hand, when a battle is performed in a state where integration has been performed, "2" is added as the bond experience value. In addition, in another example, when "move" is performed, if integration has not been performed, no bond experience value is added, but if integration has been performed, "1" is added. Therefore, it is easier to raise the bond level when an action is performed in a state where integration has been performed. Accordingly, it is possible to promote the user to actively utilize integration.

As described above, in the exemplary embodiment, the special weapons are made usable by performing integration using the ring. In this case, even when the special weapons are a weapon type that is originally not usable at the class at that time, the special weapons are made usable. Accordingly, the strategic characteristics in a battle are enhanced, and the entertainment characteristics of the game are improved.

As described above, in the exemplary embodiment, the special weapons are made usable stepwise using the bond level, but the bond level is also used for control for the weapon aptitudes of the own army characters. Hereinafter, the outline of the control for the weapon aptitudes will be described.

In the game, a gimmick called "aptitude inheritance" is provided for the control for the weapon aptitudes. This gimmick is a gimmick that allows the weapon aptitude of a special character to be inherited by raising the bond level with the special character.

Figure 15:
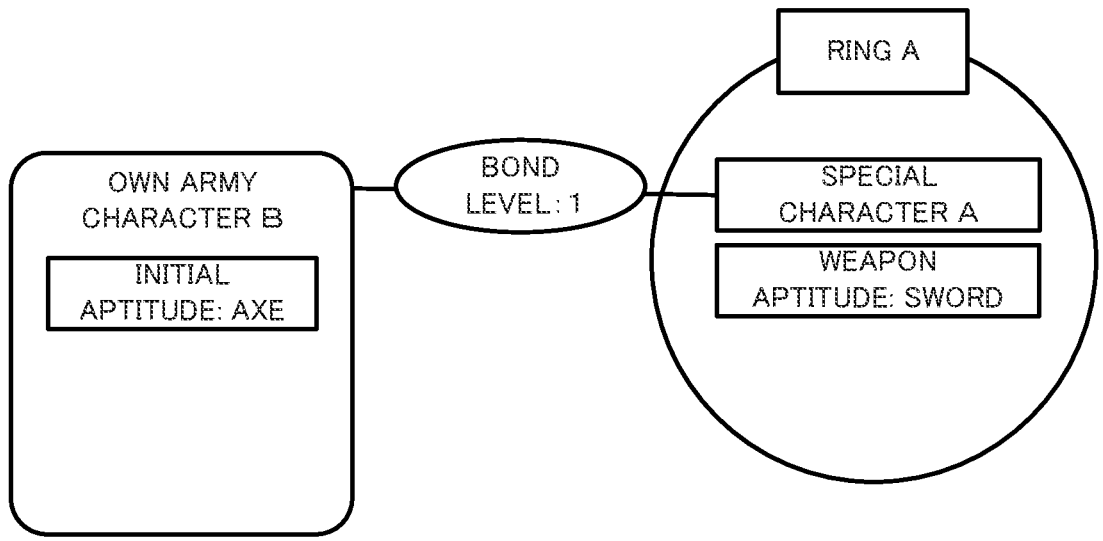
FIG. 15 conceptually illustrates a non-limiting example of aptitude inheritance.
Figure 16:
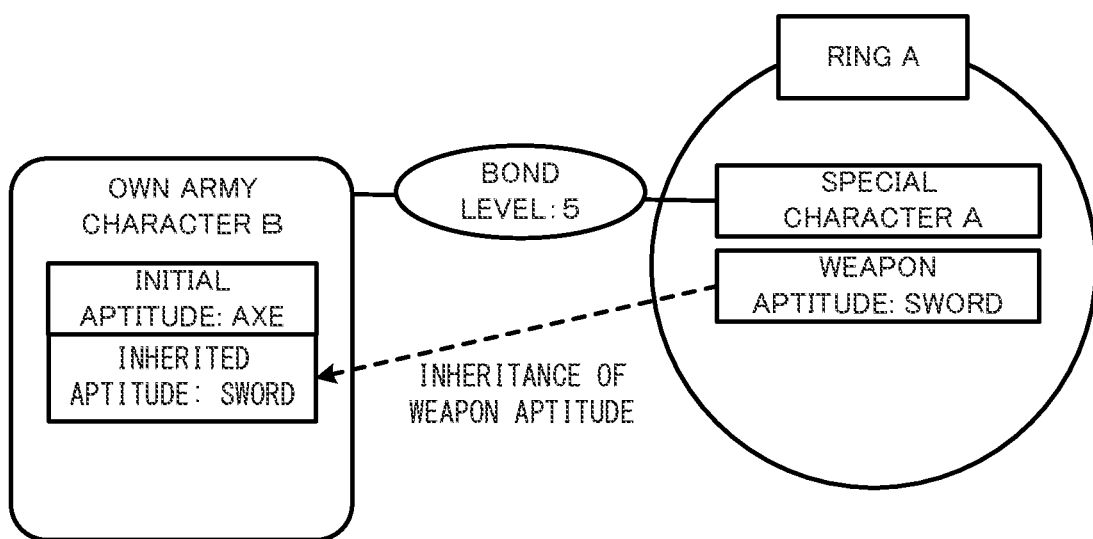
FIG. 16 conceptually illustrates a non-limiting example of the aptitude inheritance.

In the game, one weapon aptitude is set for each special character. The weapon aptitude corresponds to the weapon type of the special weapons associated with the special character (ring) (as described above, the weapon types of the special weapons associated with a certain ring and special character are the same). When the bond level between a certain own army character and a certain special character is raised to a predetermined level, the weapon aptitude of the special character can be inherited by the own army character. FIG. 15 to FIG. 18 conceptually show an example of the aptitude inheritance. First, an own army character B whose initial aptitude is "axe weapon" is assumed. When the own army character B wears (for the first time) a ring A associated with a special character A having sword aptitude, the bond level therebetween is initially 1 as shown in FIG. 15. Then, by the own army character B performing actions that satisfy the bond increase condition, the bond level is raised, and, for example, the bond level is raised to 5 as shown in FIG. 16. As a result of the bond level reaching 5, the sword aptitude of the special character A can be inherited by the own army character B.

Figure 17:
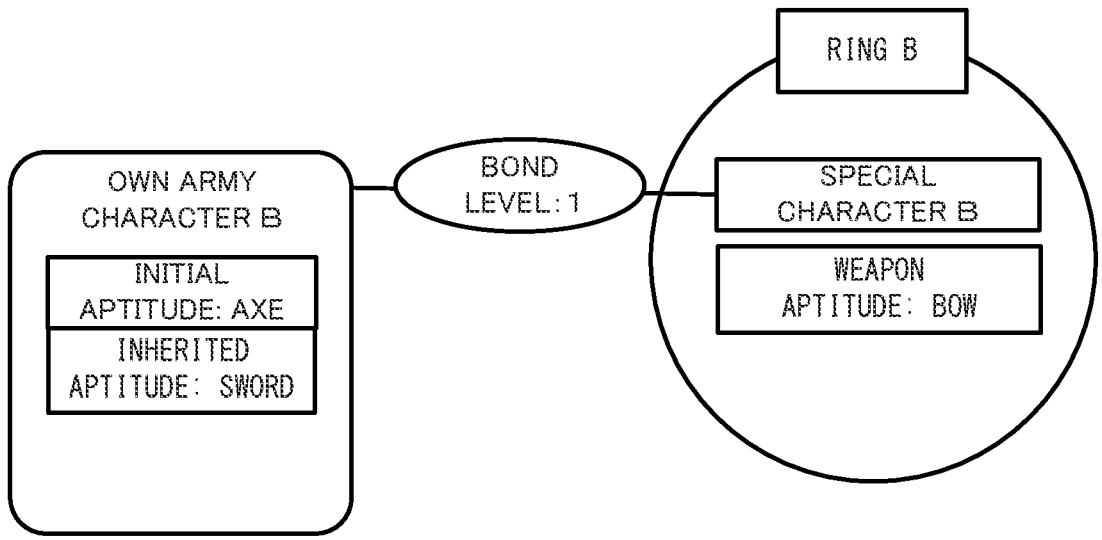
FIG. 17 conceptually illustrates a non-limiting example of the aptitude inheritance.

Furthermore, the case where, after the own army character B inherits the sword aptitude, the own army character B removes the ring A and wears (for the first time) a ring B associated with a special character B having bow aptitude, as shown in FIG. 17, is assumed. In this case, the bond level between the own army character B and the special character B is 1. In addition, for the special character B, a necessary condition for weapon aptitude inheritance is "bond level 8".

Figure 18:
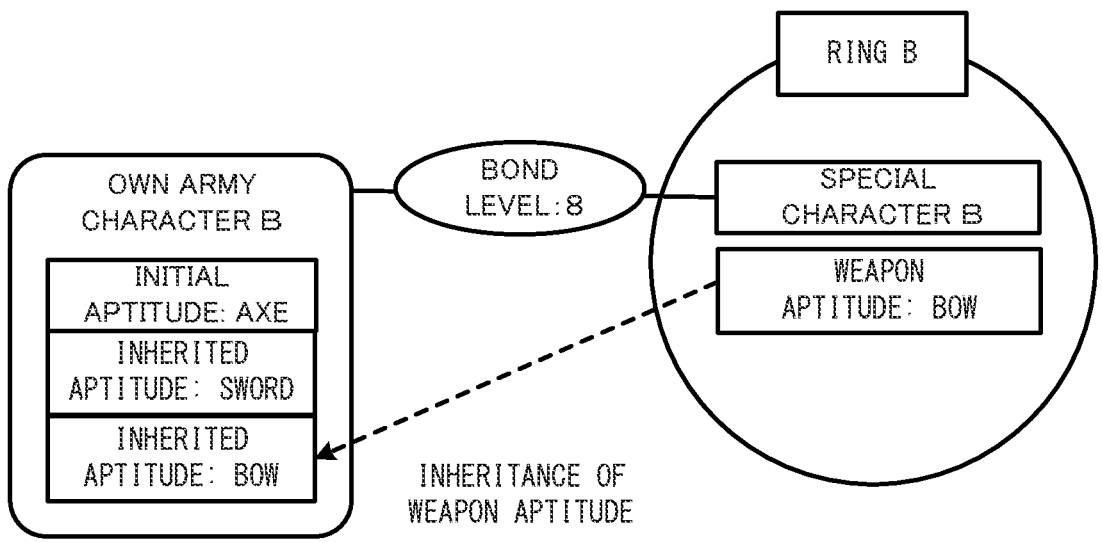
FIG. 18 conceptually illustrates a non-limiting example of the aptitude inheritance.

After this, by the own army character B performing actions that satisfy the bond increase condition, the bond level with the special character B is raised, and as shown in FIG. 18, the bond level is raised to 8, whereby the bow aptitude of the special character B can be inherited by the own army character B. Accordingly, the own army character B has inherited the two weapon aptitudes which are bow aptitude and sword aptitude. Hereinafter, a weapon aptitude acquired through inheritance is referred to as "inherited aptitude".

As a result of the above inheritance, the own army character B has "axe" as an initial aptitude and has "sword"

and "bow" as inherited aptitudes. That is, the own army character B has weapon aptitudes for three weapon types. As a result of having the three weapon aptitudes as described above, the number of classes to which the class of the own army character B can be changed is increased. That is, the class can be changed to sword class and bow class in addition to axe class.

Here, supplementary description will be given regarding the class change screen shown in FIG. 4. In the screen example shown in FIG. 4, the own army character list is displayed in the left pane 201, and information of the weapon aptitude of the currently selected own army character and a list of classes to which class change can be performed are displayed in the right pane 202. In addition, FIG. 4 illustrates a class change screen for the own army character A whose initial aptitude is sword weapon. FIG. 4 shows that the own army character A has not inherited any weapon aptitude and has no weapon aptitude other than sword. In addition, as for the class change destinations, only two options that are "swordsman" which is a beginner sword class and "sword fighter" which is an intermediate sword class are presented.

Figure 19:
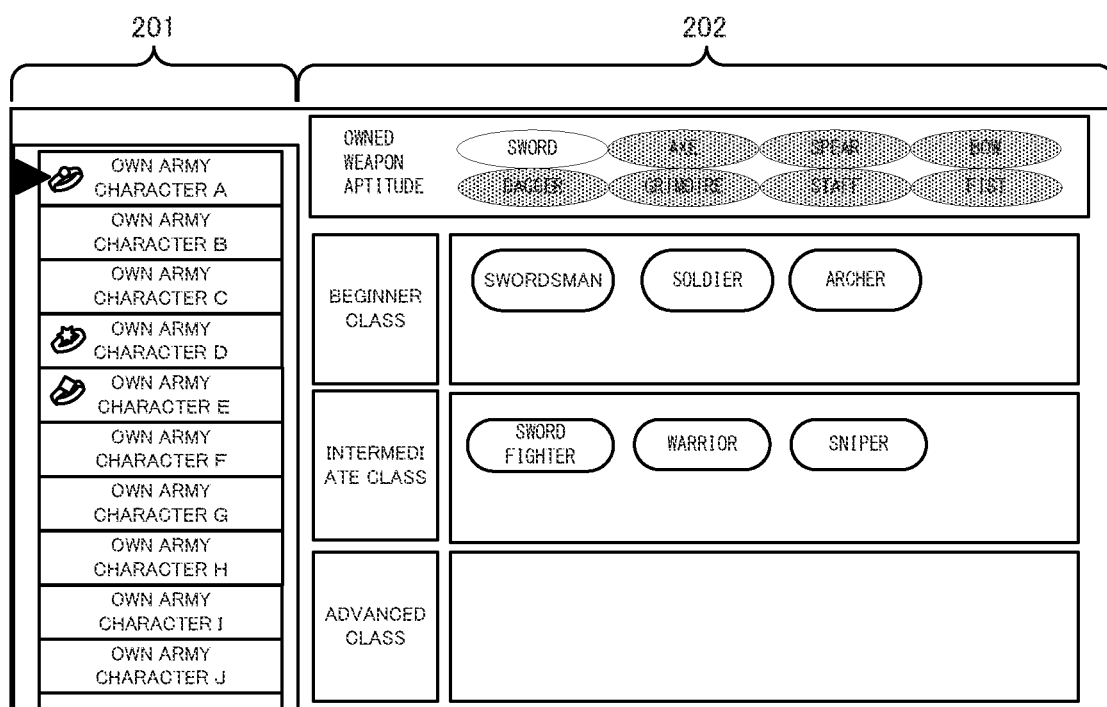
FIG. 19 illustrates a non-limiting example of the game screen.

Next, the case where the own army character A inherits weapon aptitudes of "axe" and "bow" through the above weapon aptitude inheritance is assumed. In this case, a class change screen can be displayed as shown in FIG. 19. That is, the right pane 202 shows that three weapon aptitudes of "sword", "axe", and "bow" are owned. In addition to the above sword class, "soldier" and "warrior" which are axe classes and "archer" and "sniper" which are bow classes are also presented as classes to which class change can be performed.

Meanwhile, in the game, the following control is also performed for the above weapon aptitudes and the class change. In the game, when the required weapon type for the class change destination and the initial aptitude of the own army character whose class is to be changed match each other, the weapon level is corrected and the class is changed. For example, the case where class change to a class that is sword class and that is sword fighter with a weapon level D is performed, is assumed. In this case, when the class of an own army character B whose initial aptitude is axe weapon and whose inherited aptitude is sword weapon is changed, the class change to sword fighter is completed with the weapon level maintained as D. Meanwhile, when the class of an own army character A whose initial aptitude is sword weapon is changed, the weapon level is corrected from D to C and then the class change to sword fighter is completed. As described above, in the game, when class change to a class whose weapon aptitude matches an initial aptitude is performed, the weapon level of the class is corrected and then the class change is performed.

Figure 20:
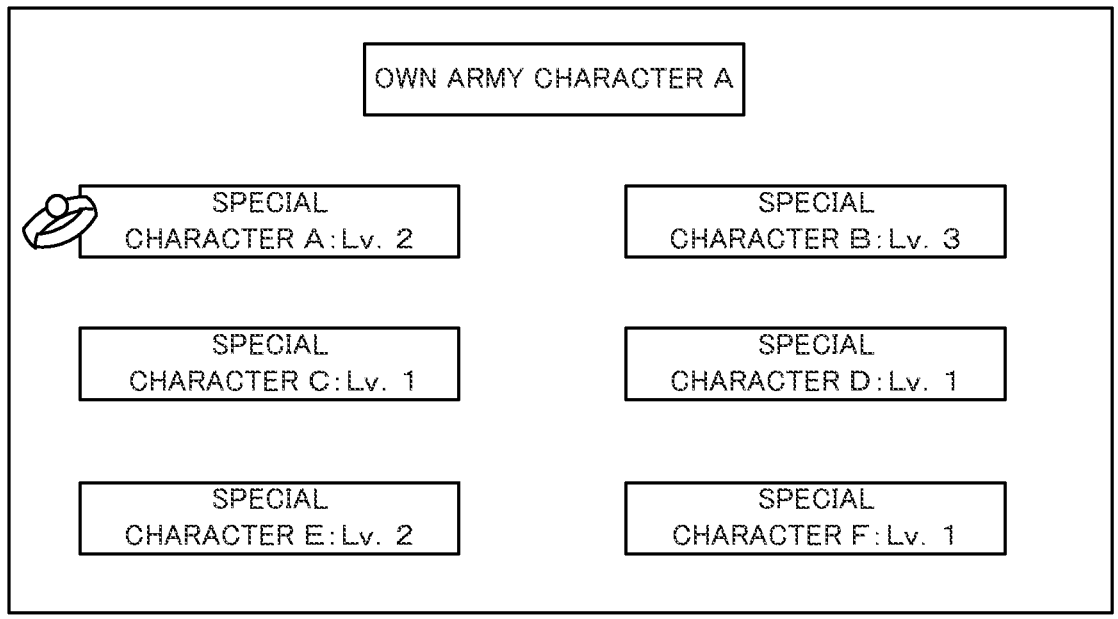
FIG. 20 illustrates a non-limiting example of the game screen.

In the game, the above weapon aptitude inheritance can be performed on the basis of an operation of the user on the above-described "bond level confirmation" screen. To illustrate an example of an operation for inheritance, first, the screen shown in FIG. 5 is a screen displaying an own army character list. A star icon is attached to each own army character whose bond level with a predetermined special character has been raised. For example, when the user selects the own army character A from this screen, a "conversation event" in which a conversation with the special character whose bond level has been raised is made in accordance with the bond level, is displayed. If the bond level has reached a level required for weapon aptitude inheritance, weapon aptitude inheritance is also performed, and a representation indicating that weapon aptitude inheritance is performed is displayed. If the bond level has not reached the level required for weapon aptitude inheritance, only the "conversation event" is displayed. Then, a confirmation screen showing the current bond level between the selected own army character and each special character is displayed as shown in FIG. 20. When there are a plurality of special characters whose bond levels have been raised (with which a "conversation event" has not been seen), the "conversation event" with each special character is continuously displayed.

In the exemplary embodiment, the conversation event occurs each time the bond level is raised by one. However, in another exemplary embodiment, the conversation event may be caused to occur when the bond level reaches a predetermined level, instead of every one level. For example, the conversation event may be caused to occur only when the bond level reaches 3, 5, and 10.

As described above, in the exemplary embodiment, by raising the bond level with the special character, the weapon aptitude can be inherited, so that the number of class change destinations can be increased. Accordingly, it is possible to provide motivation to the user to raise the bond level with the special character in the game.

[Details of Game Processing of Exemplary Embodiment]

Next, the game processing according to the exemplary embodiment will be described in more detail with reference to FIG. 21 to FIG. 32.

[Data to be Used]

Figure 21:
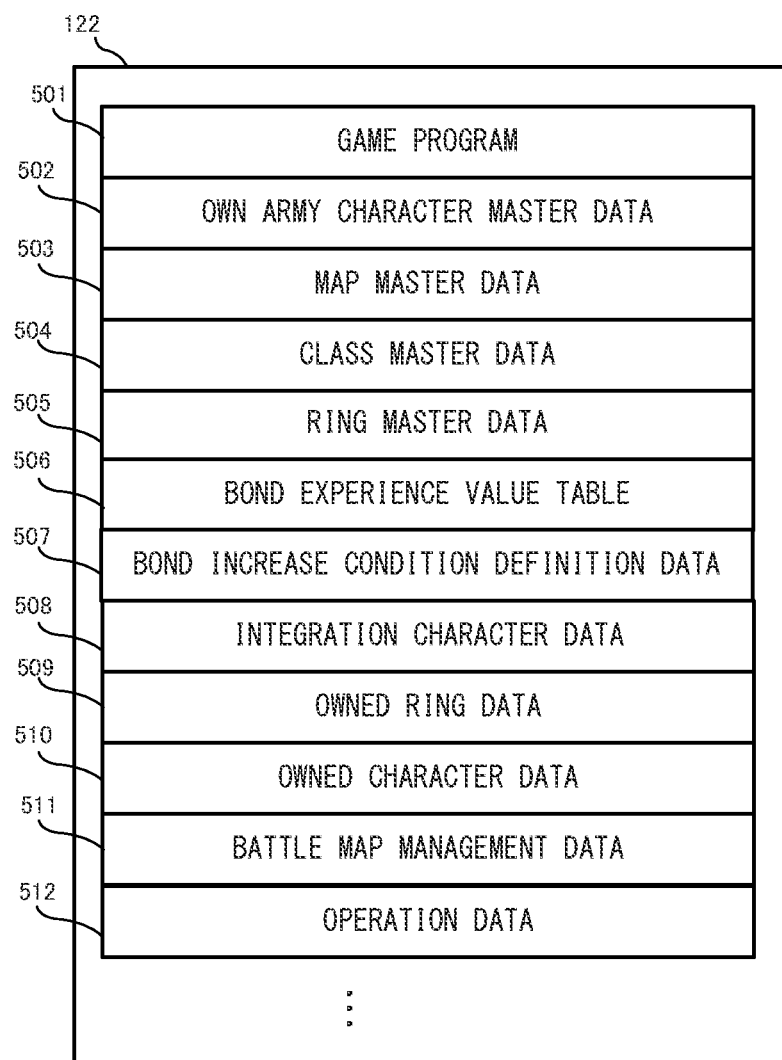
FIG. 21 illustrates a non-limiting example of data stored in a storage section 22 of the game apparatus 2.

First, various kinds of data to be used in the exemplary embodiment will be described. FIG. 21 illustrates a memory map showing an example of various kinds of data stored in the storage section 22 of the game apparatus 2. In the storage section 22 of the game apparatus 2, a game program 501, own army character master data 502, map master data 503, class master data 504, ring master data 505, a bond experience value table 506, bond increase condition definition data 507, integration character data 508, owned ring data 509, owned character data 510, battle map management data 511, operation data 512, etc., are stored.

The game program 501 is a program for executing the game processing according to the exemplary embodiment. Specifically, the game program 501 is a program for executing processes in a flowchart in FIG. 26 described later.

The own army character master data 502 is a database that defines all own army characters that appear in the game. FIG. 22 illustrates an example of the data structure of the own army character master data 502. As shown in FIG. 22, the own army character master data 502 is a database consisting of a set of records each including at least items such as an own army character ID 521, an own army character name 522, initial aptitude information 523, initial class information 524, and appearance data 525. The own army character ID 521 is an ID for identifying each own army character. The own army character name 522 is the name of each own army character. The initial aptitude information 523 is information indicating the initial aptitude of each own army character. The initial class information 524 is information indicating a class that is set as an initial class of each own army character. The appearance data 525 is various kinds of image data for forming the appearance of each own army character. In addition, the above records also include information indicating the basic status of each own army character, etc., which are not shown.

Referring back to FIG. 21, the map master data 503 is data that defines the configuration of the above battle map. Specifically, the map master data 503 includes various kinds of information for constructing each battle map, such as the size (number of cells) of each battle map, information indicating the terrain of each cell, the appearance thereof, and a terrain effect. In addition, the map master data 503 also includes information that defines a victory condition and a defeat condition in the battle map, etc.

The class master data 504 is data that defines the above-described classes. Specifically, the class master data 504 is data that defines the above necessary aptitude, weapon level, skill, basic performance, etc., for each class.

The ring master data 505 is a database that defines all the above rings that appear in the game. FIG. 23 illustrates an example of the data structure of the ring master data 505. As shown in FIG. 23, the ring master data 505 is a database consisting of a set of records each including at least items such as a ring ID 551, a special character name 522, first special weapon information 553, second special weapon information 554, third special weapon information 555, bond reward information 556, ring appearance data 557, special character appearance data 558, and inheritance aptitude information 559.

The ring ID 551 is an ID for uniquely identifying each ring. The special character name 522 is information indicating the name of a special character associated with the ring. The first special weapon information 553, the second special weapon information 554, and the third special weapon information 555 are each information indicating the above-described special weapon. In the game, up to three special weapons are set.

The bond reward information 556 is information that defines an effect or the like that can be given to the own army character when the above-described bond level is raised. In addition, the bond reward information 556 includes information of a bond level at which the above-described weapon aptitude inheritance is enabled, etc. For example, an effect or the like given in accordance with the bond level is defined, such as "strength+1" at bond level 2, "HP+2" at bond level 3, "speed+1" at bond level 4, and "weapon aptitude inheritance" at bond level 5.

The ring appearance data 557 is image data indicating the appearance of the ring. In addition, the special character appearance data 558 is image data indicating the appearance of the special character associated with the ring.

The inheritance aptitude information 559 is information that defines a weapon aptitude that can be inherited by the own army character. In other words, the inheritance aptitude information 559 is information indicating the weapon aptitude (of the special character) corresponding to the ring. In the game, all of the special weapons associated with one ring are of the same weapon type, so that information indicating one weapon aptitude is set in the inheritance aptitude information 559.

In addition, the ring master data 505 also includes information indicating the above special skill for each ring, etc., which are not shown.

Referring back to FIG. 21, the bond experience value table 506 is a table that defines a bond level and the quantity of a bond experience value required for each level. In this example, even when the bond experience value is sufficiently accumulated, the bond level is not automatically raised, and the bond level is not raised unless an operation on the above bond level confirmation screen is performed. Therefore, this table is used for determining whether or not the bond level can be raised.

The bond increase condition definition data 507 is data that defines the content of the bond increase condition described above. For example, various actions such as movement and attack are classified into actions to be performed when integration has been performed and actions to be performed when integration has not been performed, and an addition value is defined for each action.

The integration character data 508 is data that defines the above-described integration characters. The integration character data 508 is prepared for each combination of each own army character and each special character. The integration character data 508 includes image data indicating the appearance of the integration character, and data that defines parameters such as a HP (if a parameter change occurs as a result of integration) and attack power. In addition, in the battle map, during integration, a character image based on the integration character data 508 is displayed.

The owned ring data 509 is data indicating the above ring owned by the user.

The owned character data 510 is data indicating own army characters owned by (that are fellows of) the user. FIG. 24 illustrates an example of the data structure of the owned character data 510. As shown in FIG. 24, the owned character data 510 is a database consisting of a set of records each including at least items such as an owned character ID 5101, a worn ring ID 5102, inherited aptitude information 5103, bond data 5104, a current class 5105, a current Lv 5106, status information 5107, and normal belonging information 5108.

The owned character ID 5101 is the own army character ID 521 of each own army character owned by the user. As the worn ring ID 5102, the above ring ID 551 indicating the ring worn by the own army character is set. If no ring is worn, information indicating that no ring is worn is set. The inherited aptitude information 5103 is information indicating the inherited aptitudes described above, for the respective owned own army characters.

The bond data 5104 is data regarding the bond level of each of the owned own army characters. That is, the bond data 5104 is data for managing the bond level for each combination of an own army character and a special character. FIG. 25 illustrates an example of the structure of the bond data 5104. The bond data 5104 consists of a set of records each including items such as a special character ID 5109, an acquired experience value 5110, and bond level information 5111. As the special character ID 5109, the above ring ID 551 corresponding to each special character is set. The acquired experience value 5110 is information indicating the bond experience value acquired so far for each special character. The bond level information 5111 is information indicating the current bond level.

Referring back to FIG. 24, the current class 5105 is information indicating the current class of the own army character. The current Lv 5106 is information indicating the current level of the own army character. The status information 5107 is information indicating the current status of the own army character.

The normal belonging information 5108 is information indicating the owned state of the above normal items.

The owned state of each special weapon can be grasped by referring to special weapon information corresponding to the currently worn ring from the ring master data 505 on the basis of the worn ring ID 5102. In addition, whether or not each special weapon is usable during integration can be grasped on the basis of the bond level information 5111 of the bond data 5104.

Referring back to FIG. 21, the battle map management data 511 is data for managing the progress of the game, etc., in the battle map process. Specifically, the battle map management data 511 is data including the states of own army and enemy army characters that are sortieing in the battle map (HP, whether or not the character has been put to rout, etc.), position information thereof, etc. In addition, for each own army character, how many of the integration points have been accumulated, information indicating whether or not the current state is a state where integration has been performed, etc., are also included.

The operation data 512 is data indicating the content of an operation performed by the user on the controller 4. The operation data 512 is data transmitted from the controller 4 to the processor 21 at a predetermined time interval, and includes information indicating pressed states of various buttons, information indicating the content of an input to the analog stick 42, etc.

In addition, various kinds of data required for the game processing, such as data related to the story part and BGM data, which are not shown, are also stored in the storage section 22.

Next, the details of the game processing in the exemplary embodiment will be described. Here, the processing of the battle part (among which, in particular, the control for the integration and the weapon aptitude inheritance) will be mainly described, and the detailed description of other various kinds of game processing is omitted. In the exemplary embodiment, flowcharts described below are realized by one or more processors reading and executing the above program stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

[Details of Processing Executed by Processor 21]

Figure 26:
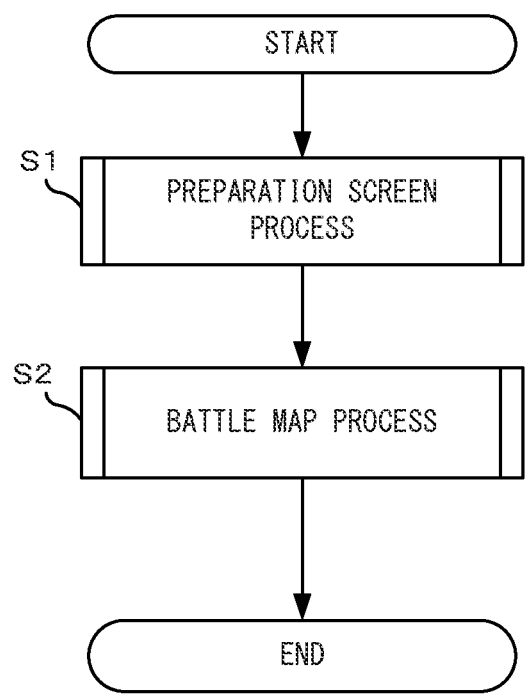
FIG. 26 is a non-limiting example flowchart showing the details of game processing according to an exemplary embodiment.

FIG. 26 is a flowchart showing the game processing related to the battle part. This processing is executed in accordance with an instruction to start the battle part being made. First, in step S1, the processor 21 executes the preparation screen process.

Figure 27:
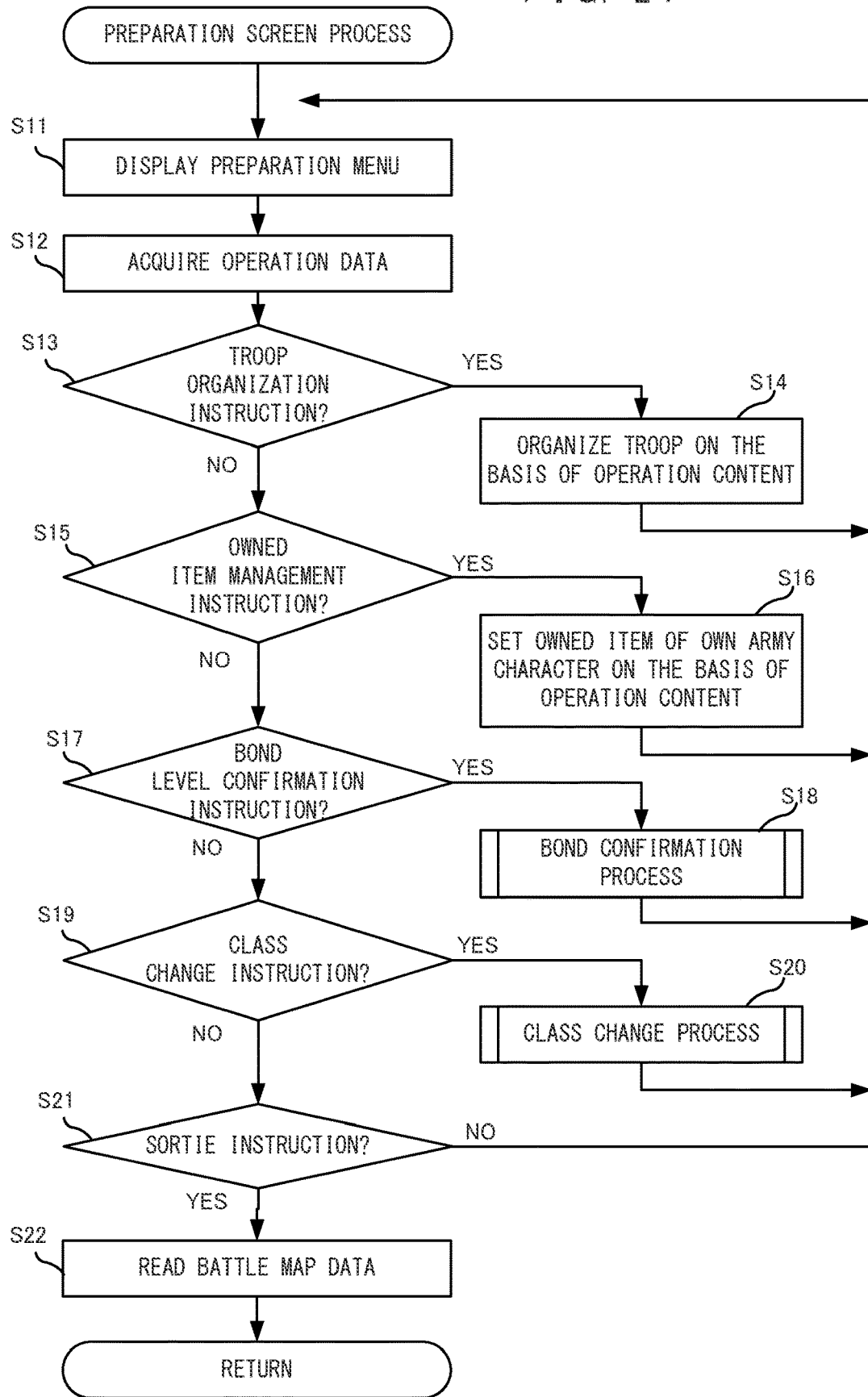
FIG. 27 is a non-limiting example flowchart showing the details of a preparation screen process.

FIG. 27 is a flowchart showing the details of the preparation screen process in step S1. First, in step S11, the processor 21 displays the preparation menu shown in FIG. 2. Next, in step S12, the processor 21 acquires the operation data 512.

[Process of Troop Organization]

Next, in step S13, the processor 21 determines whether an instruction for troop organization has been made from the preparation menu, on the basis of the operation data 512. As a result of the determination, if an instruction for troop organization has been made (YES in step S13), in step S14, the processor 21 transitions to a screen for troop organization and executes a process of organizing a troop on the basis of the operation content. Thereafter, after the troop organization ends, the processing is retuned to step S11.

[Owned Item Management Process]

On the other hand, if an instruction for troop organization has not been made (NO in step S13), in step S15, the processor 21 determines whether an instruction for owned item management has been made from the preparation menu, on the basis of the operation data 512. As a result of the determination, if an instruction for owned item management has been made (YES in step S15), in step S16, the processor 21 transitions to the owned item management screen, and performs a process of setting an owned item of an own army character on the basis of the operation content of the user. Specifically, the processor 21 sets the content of the normal belonging information 5108 such that a normal item selected by the user is owned, on the basis of the operation of the user on the owned item management screen.

In addition, the processor 21 also performs a process of setting the content of the worn ring ID 5102 on the basis of the operation of the user. That is, the processor 21 also performs a process of causing a predetermined own army character to wear the above ring. Accordingly, the own army character wearing the ring owns the above special weapons. Moreover, after an operation for ending the owned item management screen is performed, the processing is returned to step S11.

[Bond Level Confirmation Process]

On the other hand, as a result of the determination in step S15, if an instruction for owned item management has not been made (NO in step S15), in step S17, the processor 21 determines whether an instruction for bond level confirmation has been made from the preparation menu, on the basis of the operation data 512. As a result of the determination, if an instruction for bond level confirmation has been made (YES in step S17), in step S18, the processor 21 executes a bond confirmation process. After the bond confirmation process ends, the processor 21 returns to step S11 and repeats the processing.

[Bond Confirmation Screen Process]

Figure 28:
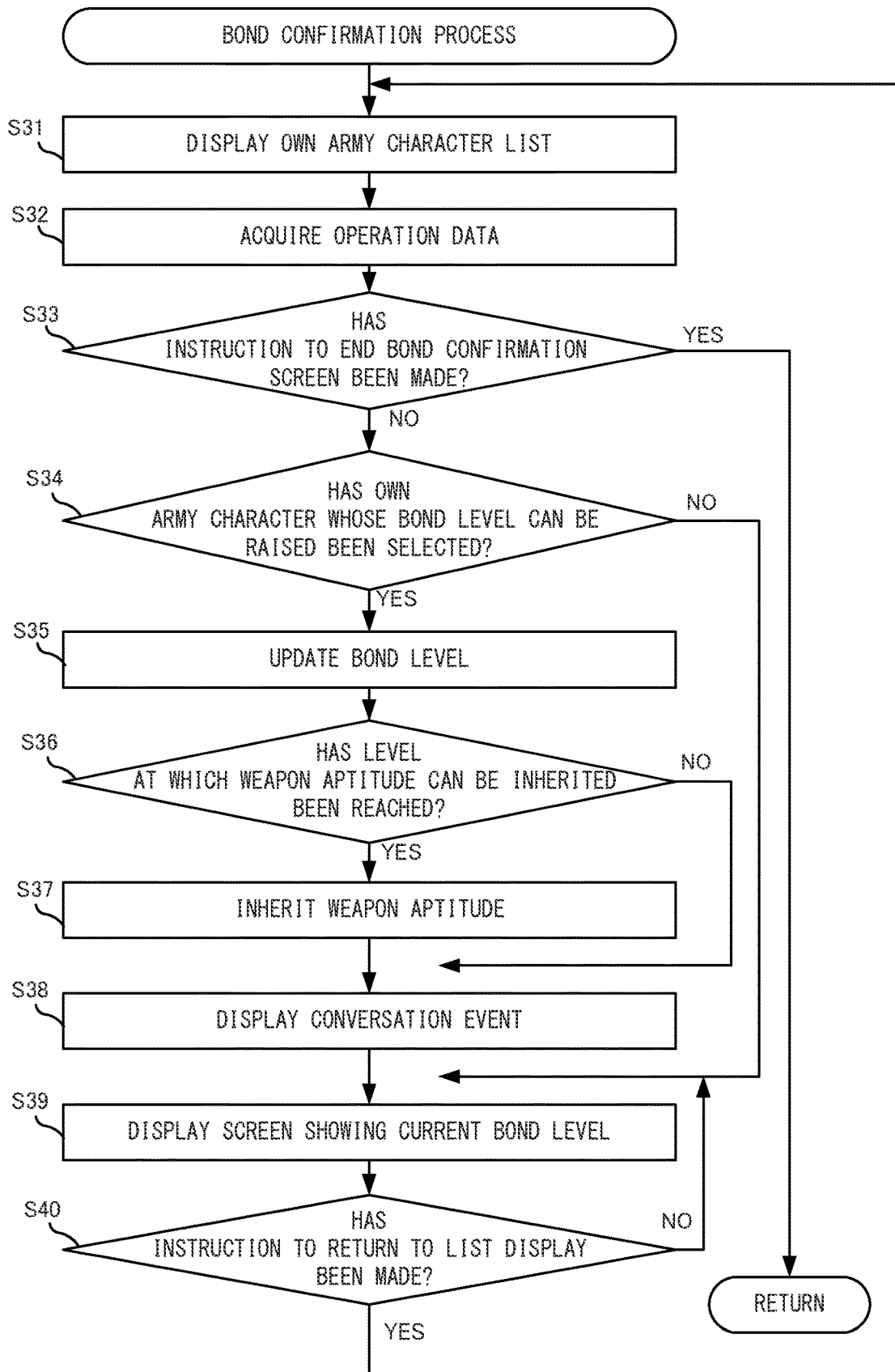
FIG. 28 is a non-limiting example flowchart showing the details of a bond confirmation process.

FIG. 28 is a flowchart showing the details of the bond confirmation process. In FIG. 28, first, in step S31, the processor 21 displays the own army character list screen shown in FIG. 5. At this time, the processor 21 refers to the bond data 5104 of each own army character and the bond experience value table 506, and displays the list screen with the star icon shown in FIG. 5 being attached to each own army character whose bond level can be raised.

Next, in step S32, the processor 21 acquires the operation data 512. In subsequent step S33, the processor 21 determines whether an instruction to end the bond level confirmation screen has been made, on the basis of the operation data 512. If such an instruction has been made (YES in step S33), the processor 21 ends the bond confirmation process. If such an instruction has not been made (NO in step S33), in step S34, the processor 21 determines whether an own army character whose bond level can be raised has been selected, on the basis of the operation data 512. If an own army character whose bond level cannot be raised has been selected (NO in step S34), the processor 21 advances the processing to step S39 described later. On the other hand, if an own army character whose bond level can be raised has been selected (YES in step S34), in step S35, the processor 21 updates the bond level information 5111 regarding the selected own army character (i.e., raises the bond level). Next, in step S36, the processor 21 determines whether the updated bond level has reached a level at which it is possible to inherit the weapon aptitude of a special character, on the basis of the above bond reward information 556. As a result of the determination, if the updated bond level is the level at which it is possible to inherit the weapon aptitude of a special character (YES in step S36), in step S37, the processor 21 causes a weapon aptitude corresponding to the special character for which the bond level has been raised, to be inherited. Specifically, the processor 21 updates the inherited aptitude information 5103 such that the weapon aptitude designated by the inheritance aptitude information 559 of the special character (ring) is added. However, if the same weapon aptitude has already been inherited from another special character, this update (addition) is not performed.

On the other hand, as a result of the determination in step S36, if the updated bond level has not reached the level at which it is possible to inherit the weapon aptitude (NO in step S36), the process in step S37 is skipped. At this time, if another effect corresponding to the bond level has been set in the bond reward information 556, a process of applying the effect to the own army character is performed.

Next, in step S38, the processor 21 displays the above "conversation event" corresponding to the bond level. This process is performed each time the bond level is raised by one. In addition, if weapon aptitude inheritance has been performed in step S37, the processor 21 also displays a predetermined representation indicating that the weapon aptitude is inherited.

Next, in step S39, the processor 21 displays the current bond level confirmation screen shown in FIG. 20. Next, in step S40, the processor 21 determines whether an instruction to return to the own army character list screen has been made, on the basis of the operation data 512. As a result, if this instruction has not been made (NO in step S40), the processor 21 returns to step S39. If this instruction has been made (YES in step S40), the processor 21 returns to step S31 and repeats the processing.

This is the end of the description of the bond confirmation process.

Referring back to FIG. 27, as a result of the determination in step S17, if an instruction for bond level confirmation has not been made (NO in step S17), in step S19, the processor 21 determines whether an instruction for class change has been made from the preparation menu, on the basis of the operation data 512. As a result of the determination, if an instruction for class change has been made (YES in step S19), in step S20, the processor 21 executes a class change process. After the class change process ends, the processor 21 returns to step S11 and repeats the processing.

[Class Change Process]

Figure 29:
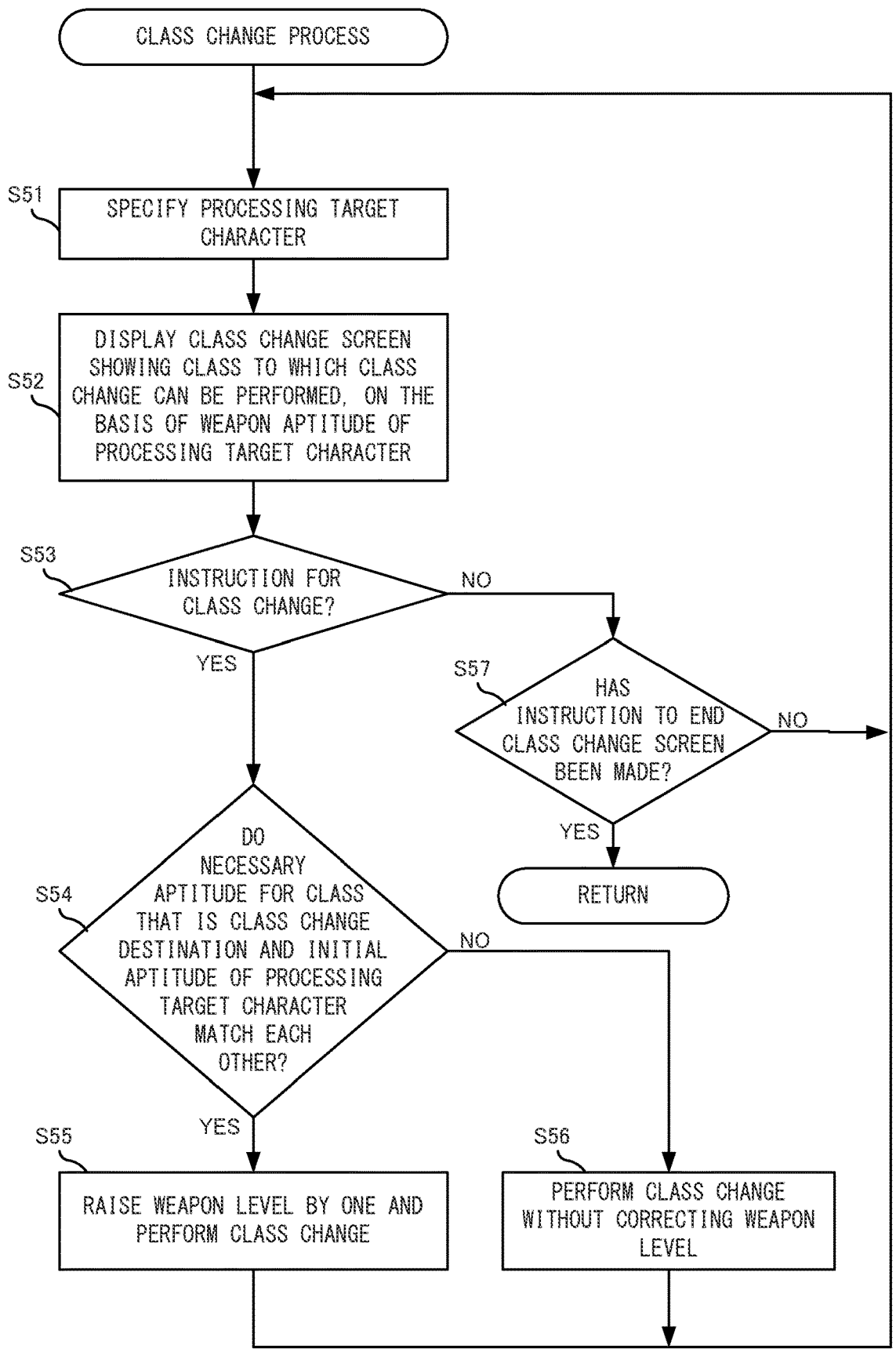
FIG. 29 is a non-limiting example flowchart showing the details of a class change process.

FIG. 29 is a flowchart showing the details of the class change process. In FIG. 29, first, in step S51, the processor 21 acquires the operation data 512, and specifies an own army character (hereinafter, referred to as processing target character) that is to be a processing target of class change, on the basis of the operation data 512. In a state immediately after the start of this process, a predetermined own army character is set as a default processing target character.

Next, in step S52, the processor 21 determines a class(es) to which class change can be performed, on the basis of the weapon aptitude (initial aptitude and inherited aptitude) of the processing target character. Furthermore, the processor 21 generates and displays a class change screen in which the class(es) to which class change can be performed is displayed in the right pane 202 as shown in FIG. 4 or FIG. 19. Then, the processor 21 waits for an operation of the user.

Next, in step S53, the processor 21 acquires the operation data 512, and determines whether an instruction for class change has been made, on the basis of the operation data 512. That is, the processor 21 determines whether an operation for determining any of the class(es) displayed in the right pane, as a class change destination, has been performed. If an instruction for class change has been made (YES in step S53), in step S54, the processor 21 determines whether the necessary aptitude for the class that is the class change destination and the initial aptitude of the processing target character match each other. As a result of the determination, if these aptitudes match each other (YES in step S54), in step S55, the processor 21 raises the weapon level by one and completes the class change. On the other hand, if these aptitudes do not match each other (NO in step S54), in step S56, the processor 21 completes the class change without correcting the weapon level. Thereafter, the processor 21 returns to step S51 and repeats the processing.

On the other hand, as a result of the determination in step S53, if an instruction for class change has not been made (NO in step S53), in step S57, the processor 21 determines whether an instruction to end the class change screen has been made. As a result of the determination, if such an instruction has not been made (NO in step S57), the processor 21 executes a process corresponding to the operation content (e.g., screen scroll) as appropriate, returns to step S51, and repeats the processing. On the other hand, if such an end instruction has been made (YES in step S57), the processor 21 ends the class change process.

Referring back to FIG. 27, as a result of the determination in step S19, if an instruction for class change has not been made (NO in step S19), in step S21, the processor 21 determines whether a sortie instruction has been made from the preparation menu. As a result of the determination, if a sortie instruction has not been made (NO in step S21), the processor 21 returns to step S11 and repeats the processing. If a sortie instruction has been made (YES in step S21), in step S22, the processor 21 reads the data of a battle map to be used this time, from the map master data 503. Then, the processor 21 constructs the battle map in a virtual space, places own army characters and enemy army characters as appropriate, and sets a state where the battle map process can be started. Thereafter, the processor 21 ends the preparation screen process.

[Battle Map Process]

Figure 30:
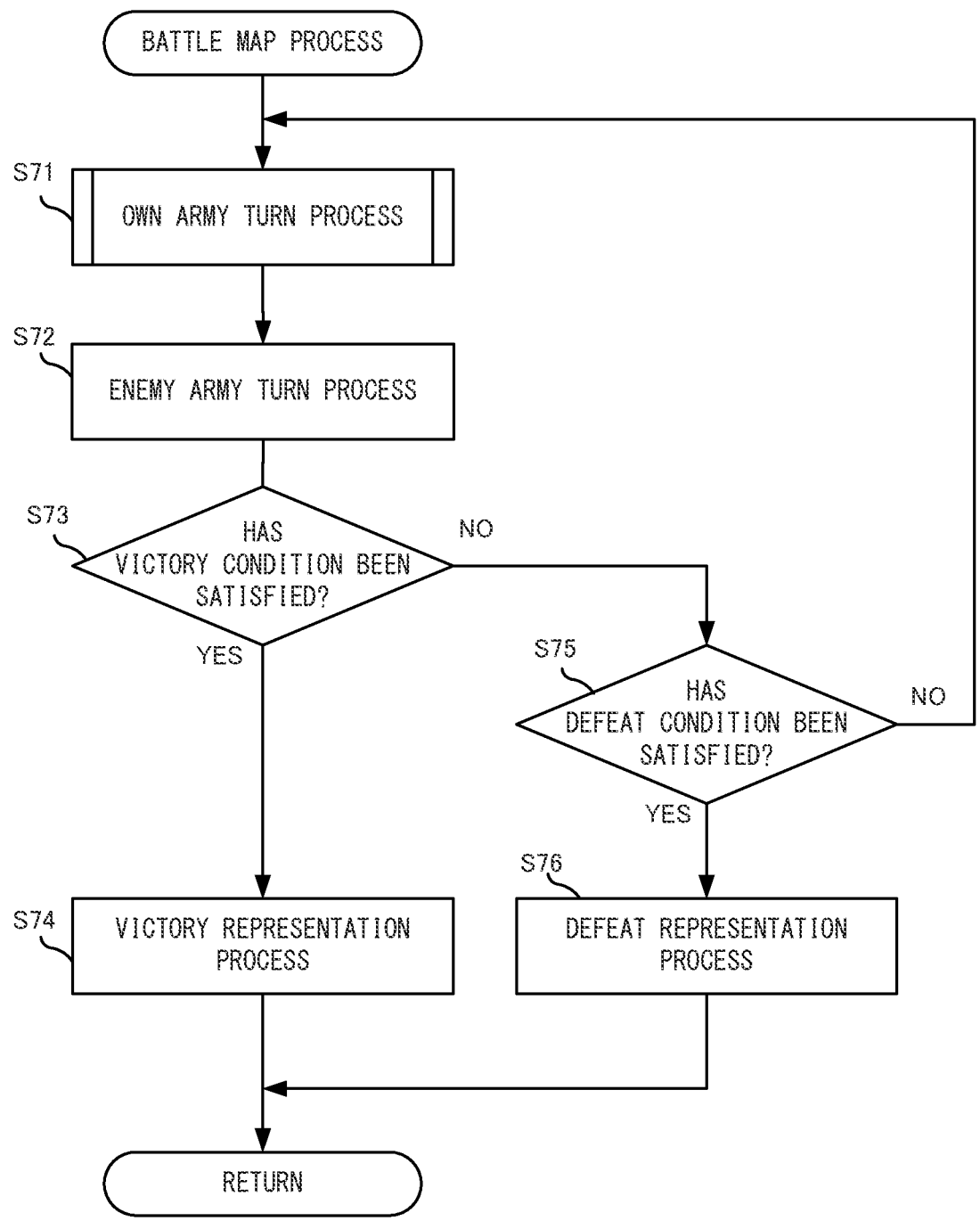
FIG. 30 is a non-limiting example flowchart showing the details of a battle map process.

Referring back to FIG. 26, after the preparation screen process ends, the processor 21 executes the battle map process in step S2. FIG. 30 is a flowchart showing the details of the battle map process. In FIG. 30, first, in step S71, the processor 21 executes an own army turn process.

Figure 31:
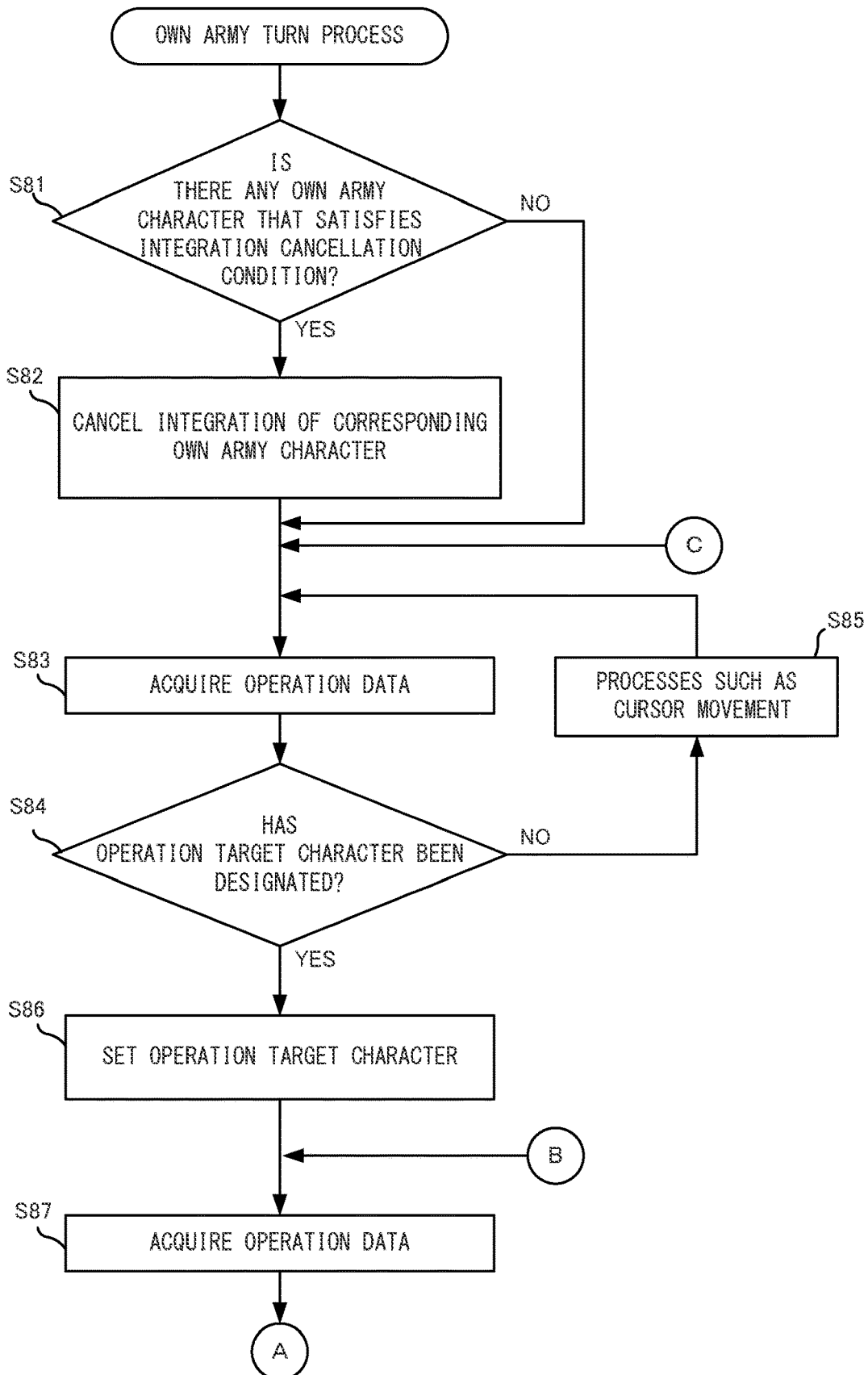
FIG. 31 is a non-limiting example flowchart showing the details of an own army turn process.
Figure 32:
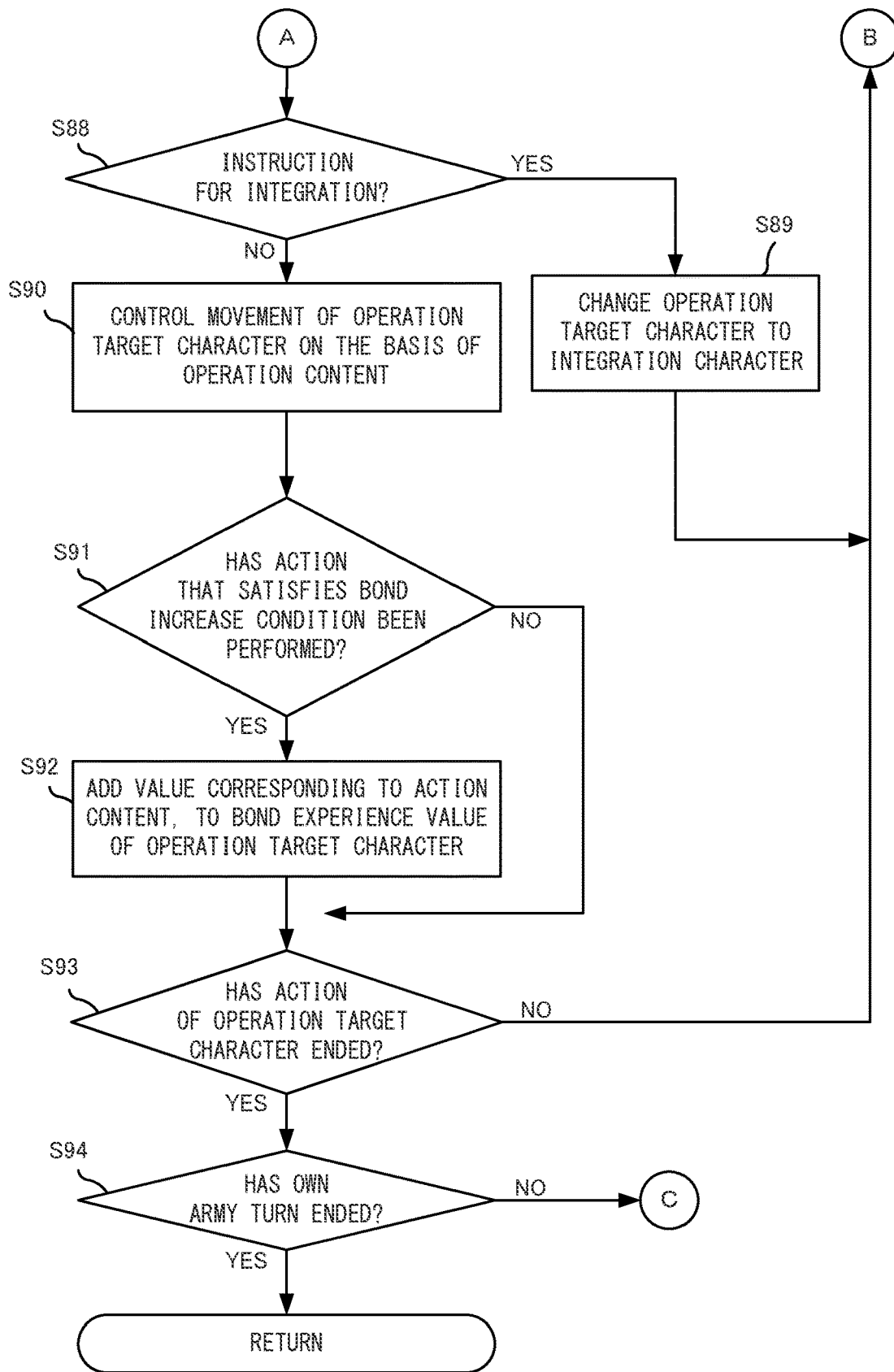
FIG. 32 is a non-limiting example flowchart showing the details of the own army turn process.

FIG. 31 is a flowchart showing the details of the above own army turn process. In FIG. 31, first, in step S81, the processor 21 determines whether an own army character that satisfies an integration cancellation condition exists on the battle map. That is, the processor 21 determines whether an own army character that has been integrated for 3 turns exists. As a result of the determination, if such an own army character exists (YES in step S81), in step S82, the processor 21 updates the battle map management data 511 such that the integration of the corresponding own army character (integration character) is cancelled. On the other hand, if such an own army character does not exist (NO in step S81), the process in step S82 is skipped.

Next, in step S83, the processor 21 acquires the operation data 512. Next, in step S84, the processor 21 determines whether an operation for designating any of the own army characters on the battle map as an operation target character has been performed. As a result of the determination, if no own army character has been designated (NO in step S84), in step S85, the processor 21 executes various processes other than movement control for an own army character. For example, the processor 21 executes processes such as moving the cursor and displaying a troop list, as appropriate on the basis of the operation data 512. Thereafter, the processor 21 displays a game image reflecting the various processes, and returns to the process in step S83.

On the other hand, if an operation target character has been designated (YES in step S84), next, in step S86, the processor 21 sets the designated own army character as an operation target character. Accordingly, the processor 21 displays the above command list. At this time, if the operation target character is in a state where integration is possible (state where the integration points have been accumulated), the processor 21 displays the command list such that a command of "integration" is included in the command list (see FIG. 13). By selecting a predetermined command from the command list, the user can cause the operation target character to perform integration, an attack, or the like.

Next, in step S87, the processor 21 acquires the operation data 512. Next, in step S88 in FIG. 32, the processor 21 determines whether an instruction for integration has been made, on the basis of the operation data 512. As a result of the determination, if an instruction for integration has been made (YES in step S88), in step S89, the processor 21 displays a representation in which the operation target character transforms into an integration character corresponding to a ring worn by the operation target character. In addition, the processor 21 sets the appearance image of the operation target character to an image of the integration character on the basis of the integration character data 508. Thereafter, the processor 21 displays a game image after this image setting change (battle map screen), and returns to step S87.

On the other hand, as a result of the determination in step S88, when an instruction for integration has not been made (NO in step S88), in step S90, the processor 21 performs movement control for the operation target character on the basis of the operation content (content selected from the command list). For example, if a "move" command has been instructed, the processor 21 performs control so as to move the operation target character to a predetermined position on the battle map, on the basis of the operation content. In addition, if an "attack" command has been instructed, the processor 21 further displays the above use weapon selection window and causes the user to select a weapon to be used for attack. At this time, in a state where the operation target character has not been integrated, only a weapon corresponding to the class at this time (belonging to the normal item) can be selected from the above use weapon selection window (see FIG. 8). On the other hand, in a state where the operation target character has been integrated, the use weapon selection window is displayed such that the above special weapon is also selectable (see FIG. 14). Then, the processor 21 determines various parameters (given damage amount, etc.) related to an attack, on the basis of the weapon selected by the user (also using the above normal skill or special skill if necessary), and performs movement control such that an attack is performed against an enemy character designated by the user. At this time, a battle animation is also displayed as described above. As described above, the battle animation is different depending on the state where integration has been performed or the state where the integration has not been performed. In addition, as a result of the attack, if the enemy army character is defeated, various processes accompanying the defeat are also executed (an experience value and an item related to the battle are obtained, etc.).

Next, in step S91, the processor 21 refers to the above bond increase condition definition data 507, and determines whether an action that satisfies the above bond increase condition has been performed. As a result of the determination, if such an action has been performed (YES in step S91), in step S92, the processor 21 adds a bond experience value corresponding to the content of the action, on the basis of the bond increase condition definition data 507. Specifically, the processor 21 adds this bond experience value to the acquired experience value 5110, related to the special character corresponding to the currently worn ring, in the above bond data 5104 of the operation target character. As described above, even when the same action is performed, a higher experience value is added if integration has been performed.

On the other hand, if an action that satisfies the bond increase condition has not been performed (NO in step S91), the process in step S92 is skipped.

Next, in step S93, the processor 21 determines whether the action of the operation target character has ended. In the game, if "wait" has been selected from the command list, it is determined that the action has ended. In addition, if "attack" has been selected, when the attack action against the enemy army character ends through subsequent selection of a weapon to be used, it is also determined that the action has ended. In other words, when the action has been performed on the basis of a command other than "attack" and "wait", it is not determined that the action has ended. As a result of the determination, if it is not determined that the action has ended (NO in step S93), the processor 21 returns to step S87 and repeats the processing. On the other hand, if it is determined that the action has ended (YES in step S93), next, in step S94, the processor 21 determines whether an own army turn has ended. In this example, if the actions of all the own army characters have been performed, or if an explicit turn ending operation has been performed by the user, it is determined that the own army turn has ended. As a result of the determination, if the own army turn has not ended (NO in step S94), the processor 21 returns to step S83 and repeats the processing. If the own army turn has ended (YES in step S94), the processor 21 ends the own army turn process.

Referring back to FIG. 30, next, in step S72, the processor 21 executes an enemy army turn process. In this process, a process of controlling movement of the enemy army characters is performed by A1 control.

Next, in step S73, the processor 21 determines whether a victory condition that is set for the currently played battle map has been satisfied. As a result of the determination, if the victory condition has been satisfied (YES in step S73), in step S74, the processor 21 executes a victory representation process of displaying a victory representation. Thereafter, the processor 21 ends the battle map process. On the other hand, if the victory condition has not been satisfied (NO in step S73), in step S75, the processor 21 determines whether a defeat condition has been satisfied. If the defeat condition has not been satisfied (NO in step S75), the processor 21 returns to step S71 and repeats the processing. On the other hand, if the defeat condition has been satisfied (YES in step S75), in step S76, the processor 21 executes a defeat representation process of displaying a defeat representation. Thereafter, the processor 21 ends the battle map process.

Referring back to FIG. 26, after the battle map process ends, the processor 21 ends the processing related to the battle part.

This is the end of the detailed description of the game processing of the exemplary embodiment.

As described above, in the exemplary embodiment, while limiting the usable weapon type for each class, the special weapons are made temporarily usable by the above integration, regardless of the limitation of the weapon type. In other words, as for the special weapons, the limitation by the weapon type is temporarily eliminated by the integration. Accordingly, while giving personality and characteristics for each own army character or class and providing strategic characteristics in which the game is basically advanced using limited weapons, weapons that originally cannot be used are made temporarily usable, whereby it is possible to further improve the strategic characteristics of the game.

Moreover, since the appearance image of the own army character is also changed along with the integration, the user is allowed to recognize that the current state is a state where a strategy using the above special weapons is possible.

In the above embodiment, by raising the bond level with the special character, it is made possible to inherit the weapon aptitude from the special character. Then, by inheriting various weapon aptitudes, the number of classes to which the above class change can be performed can be increased. Therefore, in the game, by deepening the bonds with various special characters (rings), a flow of inheriting weapon aptitudes from these special characters can be created. Accordingly, a sense of satisfaction for increasing the number of weapon aptitudes of the own army character can be enhanced, such as a sense of satisfaction that weapon inheritance is performed since the bond is strengthened. In addition, it is possible to provide a game experience that gives the user the feeling in which, as the user fights together with a special character and grows closer to the special character, the number of class change destinations is increased to improve the strategic characteristics, and the user character becomes stronger. Accordingly, it is also possible to further enhance the entertainment characteristics regarding character growth. Moreover, the "conversation event" is caused to occur by raising the bond level, whereby it is also possible to provide motivation to enjoy various combinations of special characters and own army characters in the game.

[Modifications]

In the above embodiment, as the integration cancellation condition, the example of three turns having elapsed from integration has been described. That is, the example of counting down (starting from 3) or counting up (starting from 0) each time one turn elapses has been described. In another exemplary embodiment, for example, counting may be performed every one battle or every one action, not every turn. In addition, counting for integration cancellation may be performed according to various in-game events.

In the above embodiment, as for the above aptitude inheritance, the example of performing the aptitude inheritance through a manual operation from the "bond level confirmation screen" has been described. In addition, in another exemplary embodiment, for example, at the end of the battle map process, if the bond level satisfies a condition for raising the level, the above conversation event may be automatically presented, and the aptitude inheritance may be automatically performed.

In the above embodiment, as for the ring (special weapon), the example in which any own army character can wear (own) the ring (special weapon) has been described. In this regard, in another exemplary embodiment, a specific ring may be able to be worn by only a specific own army character. In such a case as well, the special weapon cannot be used by merely wearing the ring, and the above integration may need to be performed to make the special weapons usable.

In the above embodiment, the "weapons" used for attack have been described as an example of the items (special weapons) that cannot be used unless integration has been performed. In another exemplary embodiment, the above-described processing may be applied to other various items as items corresponding to the above special weapons, in addition to the weapons.

As for the bond experience value, the case of adding the bond experience value has been described above as an example. However, in another exemplary embodiment, a parameter corresponding to the above bond experience value may be decreased or increased as long as such a decrease or increase in the parameter is a change that satisfies the condition for enabling the above aptitude inheritance.

As for the bond experience value and the bond level, the example of increasing the bond experience value and raising the bond level by taking an action that satisfies the bond increase condition in the battle map has been described in the above example. In addition, it may be possible to raise a bond level related to a combination of a specific own army character and a special character by satisfying a predetermined special condition in the preparation screen (before start of the battle map). Specifically, in the above preparation screen, for example, an item called "training" may be prepared. If the user selects this item, the screen may transition to a screen for "training", and an event in which an own army character designated by the user is caused to battle against a special character designated by the user may be executed. Then, a value corresponding to a victory or defeat of the own army character, or a constant value regardless of victory or defeat, may be added to the bond experience value. Accordingly, it is possible to provide a means for raising the bond level in addition to actions in the battle map, thereby improving the convenience of the user. In addition, it is also possible to raise the bond level before the start of the battle map. Therefore, for example, it is possible to provide a relief function for the user by giving room that class change is possible, when the need for class change suddenly arises due to, for example, the characteristics of a battle map to be played, or the like.

In the above embodiment, the example in which the rings (special characters) and the own army characters have a "multiple-to-multiple" relationship has been described. In another exemplary embodiment, the relationship between the rings and the own army characters may be a "one-to-multiple" relationship, a "multiple-to-one" relationship, or a "one-to-one" relationship.

In the above embodiment, as for the special weapons, the case where the weapon types of special weapons associated with a certain ring are all the same has been described as an example. In another exemplary embodiment, different weapon types of special weapons may be associated with one ring. In the above example, as for the special weapons associated with the ring A, the special weapon A1 and A2 which are sword weapons and the special weapon A3 which is a bow weapon may be associated with the ring A. In addition, as for the weapon aptitude to be inherited in this case, the weapon aptitude may be a weapon aptitude corresponding to a part of the special weapons. In this example, sword aptitude or bow aptitude may be set as the weapon aptitude to be inherited by an own army character. Alternatively, a plurality of weapon aptitudes may be set as weapon aptitudes to be inherited. That is, sword aptitude and bow aptitude may be set as weapon aptitudes to be inherited. In this case, sword aptitude and bow aptitude may be inherited one by one when different bond levels are reached as described above. For example, sword aptitude may be inherited at bond level 3, and bow aptitude may be inherited at bond level 8. Alternatively, sword aptitude and bow aptitude may be inherited together at one time.

In the above embodiment, as for the relationship between the ring and the special character (and the special weapons), the example of a character inhabiting a ring has been described. The example of using an element that the own character wears a ring has been described. In this regard, in another exemplary embodiment, the above element for a ring may be omitted, and an own army character and a special character may be able to be combined without using a ring.

In the above embodiment, the special weapons are made usable by integration, regardless of the limitation of the use weapon type corresponding to the class. In another exemplary embodiment, a weapon classified as a normal item may also be made usable by integration, if the type of the weapon is the same as the weapon type of the special weapons owned at this time. For example, when a swordsman owning an "iron sword" and an "iron bow" wears a ring associated with a special weapon that is a bow weapon and is integrated, the "iron bow" may be made usable in addition to the special weapon during integration.

In the above embodiment, the TBSG has been described as an example. However, the above processing is applicable to genres of games other than the TBSG. For example, in an action game having a concept corresponding to the above class, a plurality of rings and special characters described above may be caused to appear.

In the above embodiment, the case where the series of game processing is performed in the single game apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A computer-readable non-transitory storage medium having stored therein an information processing program causing a computer of an information processing apparatus, capable of executing a game using an operation character, to:
   present a role capable of being designated among a plurality of roles with which usable item types are associated, respectively, on the basis of an aptitude information piece set for the operation character among a plurality of aptitude information pieces, and assign a role designated by a user to the operation character;
   set an arbitrary item selected by the user as an owned item owned by the operation character;
   associate a special character with which any of the plurality of aptitude information pieces is associated, with the operation character;
   advance a game event included in the game, while causing the operation character to use an item designated by the user from among aptitude items belonging to the usable item type associated with the role assigned to the operation character among the owned items owned by the operation character;
   update a parameter set for a combination of the operation character and the special character associated with the operation character, on the basis of progress of the game; and
   when the parameter related to the operation character and the special character associated with the operation character satisfies an aptitude information addition condition, add the aptitude information piece associated with the special character to the operation character.

2. The storage medium according to claim 1, wherein
   a special character designated by the user among a plurality of the special characters is associated with an operation character designated by the user among a plurality of the operation characters, and
   the information processing program further causes the computer to manage the parameter for each of combinations of the plurality of the special characters and the plurality of the operation characters.

3. The storage medium according to claim 1, wherein
   in addition to the usable item type, item-specifying information for specifying a usable item among items belonging to the item type is associated with the role, and
   the game event is advanced while causing the operation character to use an item designated by the user from among the aptitude items that belong to the usable item type associated with the role assigned to the operation character and are made usable on the basis of the item-specifying information.

4. The storage medium according to claim 3, wherein at least one aptitude information piece among the plurality of aptitude information pieces is set in advance as initial aptitude information for the operation character.

5. The storage medium according to claim 4, wherein the information processing program causes the computer to, when the role assigned to the operation character corresponds to the initial aptitude information of the operation character, correct the item-specifying information associated with the role, such that the number of usable items is larger than that when the role does not correspond to the initial aptitude information.

6. The storage medium according to claim 1, wherein a skill to give an effect to the game or the game event is set for each of the plurality of roles.

7. The storage medium according to claim 1, wherein the information processing program further causes the computer to, when the operation character associated with the special character satisfies a state change condition in the game, change a state of the operation character from a first state to a second state.

8. The storage medium according to claim 7, wherein, by associating a state change item for changing the state of the operation character from the first state to the second state in the game, a special character corresponding to the state change item is associated with the operation character.

9. The storage medium according to claim 7, wherein
   when the operation character is in the first state, the game event includes a representation using the operation character and the special character associated with the operation character, and when the operation character is in the second state, the game event includes a representation using the operation character whose appearance has been changed on the basis of the special character.

10. The storage medium according to claim 7, wherein, when the parameter is updated on the basis of the progress of the game, the parameter is updated such that the aptitude information addition condition is more easily satisfied when the operation character is in the first state than when the operation character is in the second state.

11. The storage medium according to claim 7, wherein, in the game event during the game,
when the operation character is in the first state, the game event is advanced using an item designated by the user among use item candidates including an aptitude item belonging to an item type usable by the operation character among first owned items and not including a second owned item, and
when the operation character is in the second state, the game event is advanced using an item designated by the user among use item candidates including the aptitude item and further including the second owned item regardless of the item type usable by the operation character.

12. The storage medium according to claim 1, wherein the game event is a battle event between the operation character and an enemy character, and
the game event is advanced in accordance with a superiority relationship between an item type of the item designated by the user as an item to be used by the operation character and an item type of an item to be used by the enemy character.

13. The storage medium according to claim 1, wherein the information processing program further causes the computer to update the parameter regardless of the progress of the game when a special condition regarding the special character is satisfied.

14. The storage medium according to claim 1, wherein the information processing program further causes the computer to, when the parameter related to the operation character and the special character associated with the operation character satisfies the predetermined condition, execute a conversation event in which the operation character and the special character appear.

15. The storage medium according to claim 1, wherein the game is a turn-based strategy game.

16. An information processing apparatus comprising at least one processor and capable of executing a game using an operation character, the information processing apparatus:
presenting a role capable of being designated among a plurality of roles with which usable item types are associated, respectively, on the basis of an aptitude information piece set for the operation character among a plurality of aptitude information pieces, and assigning a role designated by a user to the operation character;
setting an arbitrary item selected by the user as an owned item owned by the operation character;
associating a special character with which any of the plurality of aptitude information pieces is associated, with the operation character;
advancing a game event included in the game, while causing the operation character to use an item designated by the user from among aptitude items belonging to the usable item type associated with the role assigned to the operation character among the owned items owned by the operation character;
updating a parameter set for a combination of the operation character and the special character associated with the operation character, on the basis of progress of the game; and
when the parameter related to the operation character and the special character associated with the operation character satisfies an aptitude information addition condition, adding the aptitude information piece associated with the special character to the operation character.

17. An information processing method executed by a computer of an information processing apparatus capable of executing a game using an operation character, the information processing method causing the computer to:
present a role capable of being designated among a plurality of roles with which usable item types are associated, respectively, on the basis of an aptitude information piece set for the operation character among a plurality of aptitude information pieces, and assign a role designated by a user to the operation character;
set an arbitrary item selected by the user as an owned item owned by the operation character;
associate a special character with which any of the plurality of aptitude information pieces is associated, with the operation character;
advance a game event included in the game, while causing the operation character to use an item designated by the user from among aptitude items belonging to the usable item type associated with the role assigned to the operation character among the owned items owned by the operation character;
update a parameter set for a combination of the operation character and the special character associated with the operation character, on the basis of progress of the game; and
when the parameter related to the operation character and the special character associated with the operation character satisfies an aptitude information addition condition, add the aptitude information piece associated with the special character to the operation character.

18. The information processing method according to claim 17, wherein
a special character designated by the user among a plurality of the special characters is associated with an operation character designated by the user among a plurality of the operation characters, and
the information processing method further causes the computer to manage the parameter for each of combinations of the plurality of the special characters and the plurality of the operation characters.

19. The information processing method according to claim 17, wherein
in addition to the usable item type, item-specifying information for specifying a usable item among items belonging to the item type is associated with the role, and
the game event is advanced while causing the operation character to use an item designated by the user from among the aptitude items that belong to the usable item type associated with the role assigned to the operation character and are made usable on the basis of the item-specifying information.

20. An information processing system capable of executing a game using an operation character, the information processing system comprising a processor and a memory coupled thereto, the processor being configured to control the information processing system to at least:

present a role capable of being designated among a plurality of roles with which usable item types are associated, respectively, on the basis of an aptitude information piece set for the operation character among a plurality of aptitude information pieces, and assign a role designated by a user to the operation character;

set an arbitrary item selected by the user as an owned item owned by the operation character;

associate a special character with which any of the plurality of aptitude information pieces is associated, with the operation character;

advance a game event included in the game, while causing the operation character to use an item designated by the user from among aptitude items belonging to the usable item type associated with the role assigned to the operation character among the owned items owned by the operation character;

update a parameter set for a combination of the operation character and the special character associated with the operation character, on the basis of progress of the game; and when the parameter related to the operation character and the special character associated with the operation character satisfies an aptitude information addition condition, add the aptitude information piece associated with the special character to the operation character.

\* \* \* \* \*